(12) United States Patent
Takizawa et al.

(10) Patent No.: US 12,399,010 B2
(45) Date of Patent: Aug. 26, 2025

(54) PHYSICAL QUANTITY SENSOR, INERTIAL MEASUREMENT UNIT, AND MANUFACTURING METHOD

(71) Applicant: SEIKO EPSON CORPORATION, Tokyo (JP)

(72) Inventors: Teruo Takizawa, Matsumoto (JP); Satoru Tanaka, Chino (JP)

(73) Assignee: SEIKO EPSON CORPORATION (JP)

( * ) Notice: Subject to any disclaimer, the term of this patent is extended or adjusted under 35 U.S.C. 154(b) by 317 days.

(21) Appl. No.: 18/171,495

(22) Filed: Feb. 20, 2023

(65) Prior Publication Data

US 2023/0266126 A1 Aug. 24, 2023

(30) Foreign Application Priority Data

Feb. 21, 2022 (JP) ................. 2022-024691

(51) Int. Cl.
| | |
|---|---|
| *G01C 21/16* | (2006.01) |
| *G01P 15/08* | (2006.01) |
| *G01P 15/125* | (2006.01) |
| *G01P 15/18* | (2013.01) |

(52) U.S. Cl.
CPC ............. *G01C 21/16* (2013.01); *G01P 15/08* (2013.01); *G01P 15/0802* (2013.01); *G01P 15/125* (2013.01); *G01P 15/18* (2013.01)

(58) Field of Classification Search
CPC .......... G01P 15/125; G01P 5/18; G01P 15/08; G01P 15/0802; G01C 21/16
See application file for complete search history.

(56) References Cited

U.S. PATENT DOCUMENTS

| | | | |
|---|---|---|---|
| 2002/0158293 A1 | 10/2002 | Lee et al. | |
| 2004/0231421 A1* | 11/2004 | Yoshioka | G01P 15/0802 73/514.32 |
| 2006/0213268 A1 | 9/2006 | Asami et al. | |
| 2007/0119252 A1 | 5/2007 | Adams et al. | |
| 2008/0196500 A1* | 8/2008 | Menard | B81B 3/0045 73/514.18 |

(Continued)

FOREIGN PATENT DOCUMENTS

| | | |
|---|---|---|
| JP | 2003-014778 A | 1/2003 |
| JP | 2006-266873 A | 10/2006 |

(Continued)

*Primary Examiner* — Helen C Kwok
(74) *Attorney, Agent, or Firm* — Harness, Dickey & Pierce, P.L.C.

(57) ABSTRACT

A physical quantity sensor detects a physical quantity in a third direction, and includes a fixer fixed to a substrate, a support beam having one end coupled to the fixer, and a movable body. The movable body includes a movable electrode unit and a frame unit. The fixed electrode unit includes a first fixed electrode group and a second fixed electrode group. The movable electrode unit includes a first movable electrode group and a second movable electrode group. A first recess recessed in the third direction is provided in the first movable electrode group, a second recess recessed in the third direction is provided in the second fixed electrode group, and a third recess recessed in the third direction is provided in a region of the frame unit on a second movable electrode group side.

13 Claims, 15 Drawing Sheets

(56) References Cited

U.S. PATENT DOCUMENTS

| | | | |
|---|---|---|---|
| 2012/0139064 A1* | 6/2012 | Nakatani | G01P 15/125 |
| | | | 257/E21.001 |
| 2013/0147313 A1* | 6/2013 | Sachse | B81C 1/00619 |
| | | | 310/300 |
| 2013/0255382 A1* | 10/2013 | Tanaka | G01P 15/125 |
| | | | 73/514.32 |
| 2015/0301075 A1* | 10/2015 | Yamanaka | G01P 1/006 |
| | | | 73/514.32 |
| 2016/0332864 A1 | 11/2016 | Iihola et al. | |
| 2016/0332872 A1 | 11/2016 | Iihola et al. | |
| 2017/0010300 A1* | 1/2017 | Kigure | G01P 15/125 |
| 2018/0156839 A1* | 6/2018 | Tanaka | B60G 17/01941 |
| 2018/0321275 A1 | 11/2018 | Liukku et al. | |
| 2019/0064206 A1* | 2/2019 | Tanaka | B81B 7/007 |
| 2019/0094258 A1* | 3/2019 | Tanaka | G01P 15/125 |
| 2019/0094262 A1* | 3/2019 | Ito | G01P 15/135 |
| 2020/0408803 A1 | 12/2020 | Konno et al. | |
| 2021/0171337 A1 | 6/2021 | Liukku et al. | |

FOREIGN PATENT DOCUMENTS

| | | |
|---|---|---|
| JP | 2009-500635 A | 1/2009 |
| JP | 2018-515353 A | 6/2018 |
| JP | 2019-023614 A | 2/2019 |
| JP | 2021-004875 A | 1/2021 |
| JP | 2021-524035 A | 9/2021 |

\* cited by examiner

STATE OF NO GRAVITY

PHYSICAL QUANTITY SENSOR, INERTIAL MEASUREMENT UNIT, AND MANUFACTURING METHOD

The present application is based on, and claims priority from JP Application Serial Number 2022-024691, filed Feb. 21, 2022, the disclosure of which is hereby incorporated by reference herein in its entirety.

BACKGROUND

1. Technical Field

The present disclosure relates to a physical quantity sensor, an inertial measurement unit, and a manufacturing method.

2. Related Art

JP-T-2018-515353 discloses a physical quantity sensor including at least one rotor and at least two stators. In the physical quantity sensor, the rotor and the stators are at least partially recessed from a first surface of a device layer to at least two different depths. Further, the rotor and the stators are at least partially recessed from a second surface of the device layer to at least two different depths.

According to the physical quantity sensor disclosed in JP-T-2018-515353, when two or more stators are provided, a thickness of a comb electrode of the rotor is changed for each rotor corresponding to each stator. Therefore, a center of gravity balance of a movable body with respect to a rotation axis may be lost, and a cross-axis sensitivity may be increased.

SUMMARY

An aspect of the present disclosure relates to a physical quantity sensor for detecting, when directions orthogonal to one another are defined as a first direction, a second direction, and a third direction, a physical quantity in the third direction, and the physical quantity sensor includes: a fixer fixed to a substrate; a support beam having one end coupled to the fixer; a fixed electrode unit provided at the substrate and including a first fixed electrode group and a second fixed electrode group; and a movable body including a movable electrode unit and a frame unit, the movable electrode unit including a first movable electrode group in which a movable electrode faces a fixed electrode of the first fixed electrode group and a second movable electrode group in which a movable electrode faces a fixed electrode of the second fixed electrode group, the frame unit coupling the movable electrode unit and another end of the support beam. A first recess recessed in the third direction is provided in the first movable electrode group, a second recess recessed in the third direction is provided in the second fixed electrode group, and a third recess recessed in the third direction is provided in a region of the frame unit on a second movable electrode group side.

Another aspect of the present disclosure relates to an inertial measurement unit including the physical quantity sensor described above and a controller configured to perform control based on a detection signal output from the physical quantity sensor.

In addition, another aspect of the present disclosure relates to a method for manufacturing a physical quantity sensor for detecting, when three directions orthogonal to one another are defined as a first direction, a second direction, and a third direction, a physical quantity in the third direction, the method includes: a fixed electrode unit forming step of forming a fixed electrode unit at a substrate; and a movable body forming step of forming a movable body. The physical quantity sensor includes a fixer fixed to the substrate, a support beam has one end coupled to the fixer, and the fixed electrode unit is provided at the substrate and includes a first fixed electrode group and a second fixed electrode group. The movable body includes a movable electrode unit and a frame unit, the movable electrode unit including a first movable electrode group in which a movable electrode faces a fixed electrode of the first fixed electrode group and a second movable electrode group in which a movable electrode faces a fixed electrode of the second fixed electrode group, the frame unit coupling the movable electrode unit and another end of the support beam. In the fixed electrode unit forming step, the second fixed electrode group is formed such that a second recess recessed in the third direction is provided in the second fixed electrode group. In the movable body forming step, the first movable electrode group is formed such that a first recess recessed in the third direction is provided in the first movable electrode group, and the movable body is formed such that a third recess recessed in the third direction is provided in a region of the frame unit on a second movable electrode group side.

DESCRIPTION OF EXEMPLARY EMBODIMENTS

Hereinafter, the embodiment will be described. The embodiment to be described below does not unduly limit the contents described in the claims. Further, all configurations described in the embodiment are not necessarily essential constituent elements.

1. Physical Quantity Sensor

Figure 1:
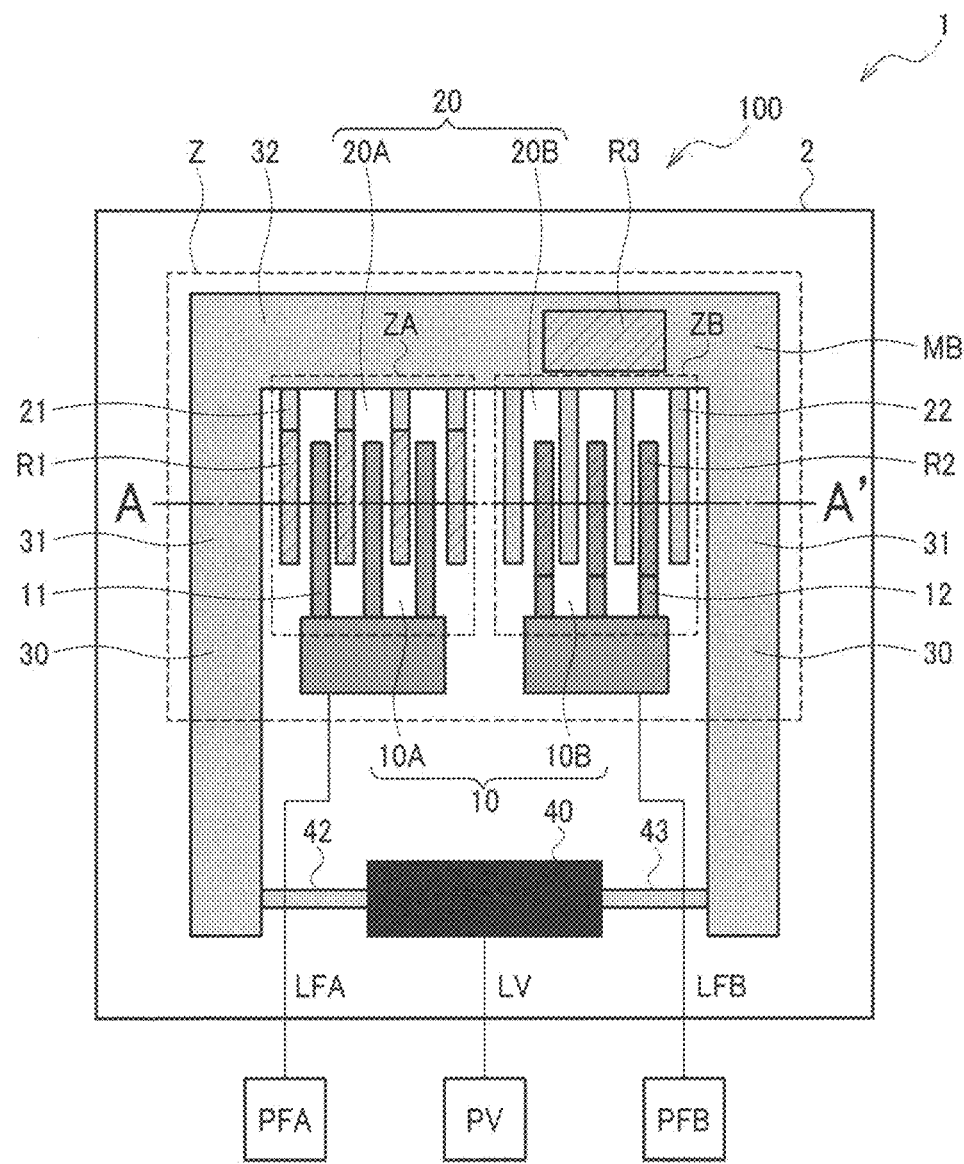
FIG. 1 shows a configuration example of a physical quantity sensor according to an embodiment.
Figure 1:
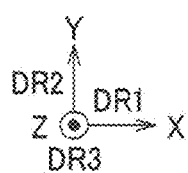

A configuration example of a physical quantity sensor 1 according to the embodiment will be described with reference to FIG. 1 by taking an acceleration sensor that detects acceleration in a vertical direction as an example. FIG. 1 is a plan view of the physical quantity sensor 1 in a plan view in a direction orthogonal to a substrate 2. The physical quantity sensor 1 is a micro electro mechanical systems (MEMS) device, and is, for example, an inertial sensor.

In FIG. 1 and FIGS. 2 to 10 and 13 to 22 to be described later, for convenience of description, dimensions of members, intervals between the members, and the like are schematically shown, and not all components are shown. For example, an electrode wiring, an electrode terminal, and the like are not shown. Further, in the following description, a case where a physical quantity detected by the physical quantity sensor 1 is the acceleration will be mainly described as an example, but the physical quantity is not limited to the acceleration and may be another physical quantity such as a velocity, pressure, displacement, an angular velocity, and gravity. The physical quantity sensor 1 may be used as a pressure sensor, a MEMS switch, or the like. In FIG. 1, directions orthogonal to one another are referred to as a first direction DR1, a second direction DR2, and a third direction DR3. The first direction DR1, the second direction DR2, and the third direction DR3 are, for example, an X-axis direction, a Y-axis direction, and a Z-axis direction, respectively, and are not limited thereto. For example, the third direction DR3 corresponding to the Z-axis direction is a direction orthogonal to the substrate 2 of the physical quantity sensor 1, and is, for example, the vertical direction. A fourth direction DR4 is a direction opposite to the third direction DR3, and is, for example, a direction on a negative side in the Z-axis direction. The first direction DR1 corresponding to the X-axis direction and the second direction DR2 corresponding to the Y-axis direction are directions orthogonal to the third direction DR3, and an XY plane that is a plane along the first direction DR1 and the second direction DR2 is, for example, along a horizontal plane. The term "orthogonal" includes not only a case of crossing at 90° but also a case of crossing at an angle slightly inclined from 90°.

The substrate 2 is, for example, a silicon substrate made of semiconductor silicon or a glass substrate made of a glass material such as borosilicate glass. However, a constituent material of the substrate 2 is not particularly limited, and a quartz substrate, a silicon on insulator (SOI) substrate, or the like may be used.

As shown in FIG. 1, the physical quantity sensor 1 according to the embodiment includes a fixed electrode unit 10, a movable body MB, a fixer 40, and support beams 42 and 43. The movable body MB includes a movable electrode unit 20 and a frame unit 30, and the frame unit 30 includes two first portions 31 extending in the second direction DR2 as a long-side direction and one second portion 32 extending in the first direction DR1 as the long-side direction.

A first detection element 100 of the physical quantity sensor 1 includes the fixed electrode unit 10, the movable electrode unit 20, the frame unit 30, the fixer 40, and the support beams 42 and 43. The first detection element 100 detects the physical quantity, for example, the acceleration in the third direction DR3, which is the Z-axis direction, in a detector ZA and a detector ZB.

The fixed electrode unit 10 includes a first fixed electrode group 10A and a second fixed electrode group 10B. The first fixed electrode group 10A and the second fixed electrode group 10B are provided at the substrate 2. The first fixed electrode group 10A and the second fixed electrode group 10B are fixed to the substrate 2 by the fixer. The first fixed electrode group 10A includes a plurality of fixed electrodes 11, and the second fixed electrode group 10B includes a plurality of fixed electrodes 12. The plurality of fixed electrodes 11 and the plurality of fixed electrodes 12 extend, for example, along the second direction DR2 which is the Y-axis direction. That is, the plurality of fixed electrodes 11 are provided in a comb shape, and constitute the first fixed electrode group 10A. Similarly, the plurality of fixed electrodes 12 are provided in the comb shape and constitute the second fixed electrode group 10B. In the following description, the fixed electrodes 11 included in the first fixed electrode group 10A and the fixed electrodes 12 included in the second fixed electrode group 10B are collectively referred to as fixed electrodes 14 as appropriate.

The movable electrode unit 20 includes a first movable electrode group 20A and a second movable electrode group 20B. The first movable electrode group 20A includes a plurality of movable electrodes 21, and the second movable electrode group 20B includes a plurality of movable electrodes 22. The plurality of movable electrodes 21 and the plurality of movable electrodes 22 extend from the second portion 32 of the frame unit 30 along, for example, the second direction DR2 which is the Y-axis direction. The plurality of movable electrodes 21 are provided in the comb shape and constitute the first movable electrode group 20A, and the plurality of movable electrodes 22 are provided in the comb shape and constitute the second movable electrode group 20B. The movable electrodes 21 of the first movable electrode group 20A are respectively disposed to face the fixed electrodes 11 of the first fixed electrode group 10A in the first direction DR1 which is an X direction. The movable electrodes 22 of the second movable electrode group 20B are respectively disposed to face the fixed electrodes 12 of the second fixed electrode group 10B in the first direction DR1. A portion where the fixed electrodes 11 and the movable electrodes 21 are disposed to face each other in the first direction DR1 corresponds to the detector ZA of the first detection element 100, and a portion where the fixed electrodes 12 and the movable electrodes 22 are disposed to face each other in the first direction DR1 corresponds to the detector ZB of the first detection element 100. In the following description, the movable electrodes 21 included in the first movable electrode group 20A and the movable electrodes 22 included in the second movable electrode group 20B are collectively referred to as movable electrodes 24 as appropriate.

The movable body MB moves along the support beams 42 and 43 with the first direction DR1 as a rotation axis.

Here, the support beams 42 and 43 are, for example, torsion springs, and one end of each of the support beams 42 and 43 is fixed to the substrate 2 by the fixer 40. In FIG. 1, the two support beams 42 and 43 are provided along the first direction DR1 such that the support beam 42 extends from the fixer 40 in a direction opposite to the first direction DR1 and the support beam 43 extends from the fixer 40 to a first direction DR1 side. Both ends of the frame unit 30 of the movable body MB are coupled to the other ends of the support beams 42 and 43, that is, end portions not coupled to the fixer 40, respectively. In this way, the movable body MB is formed in a substantially U-shape by the two first portions 31 and the one second portion 32 of the frame unit 30, and is coupled to the fixer 40 via the support beams 42 and 43.

In this way, the movable body MB is implemented, and the support beams 42 and 43 designed to be rotatable around the rotation axis receive a force in the third direction DR3 and are twisted along an axis in the first direction DR1, whereby the movable body MB can swing in the third direction DR3. Then, the first detection element 100 having a so-called one-sided seesaw structure in which the movable body MB swings with the fixer 40 as an anchor is implemented.

The frame unit 30 is designed such that a mass of a distal end portion thereof, that is, the second portion 32 is large and a moment of inertia I around the rotation axis is large.

Figure 2:
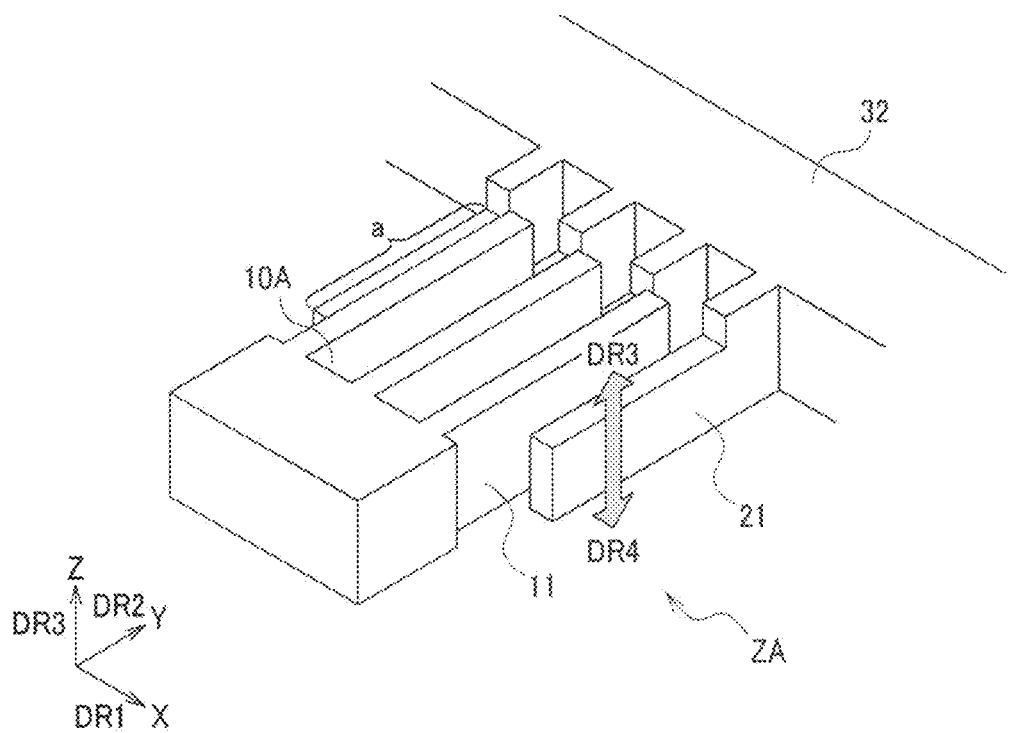
FIG. 2 is a perspective view showing a three-dimensional shape of a first recess.

In the physical quantity sensor 1 shown in FIG. 1, the movable electrodes 21 of the first movable electrode group 20A are provided with a first recess R1. FIG. 2 is a perspective view showing a three-dimensional shape of the first recess R1. As shown in FIG. 2, a thickness of the movable electrode 21 in the third direction DR3 is partially recessed. Specifically, in the second direction DR2, the thickness of the movable electrode 21 in the third direction DR3 is reduced by a range indicated by a in FIG. 2. In this way, the movable electrode 21 has the same thickness as a thickness of the frame unit 30 in the third direction DR3 from a coupling portion with the second portion 32 of the frame unit 30 to a certain range, and has a thinner thickness in the third direction DR3 mainly in a region facing the fixed electrode 11 of the first fixed electrode group 10A. The detector ZA includes the fixed electrode 11 and the movable electrode 21 having different thicknesses in the third direction DR3.

Figure 3:
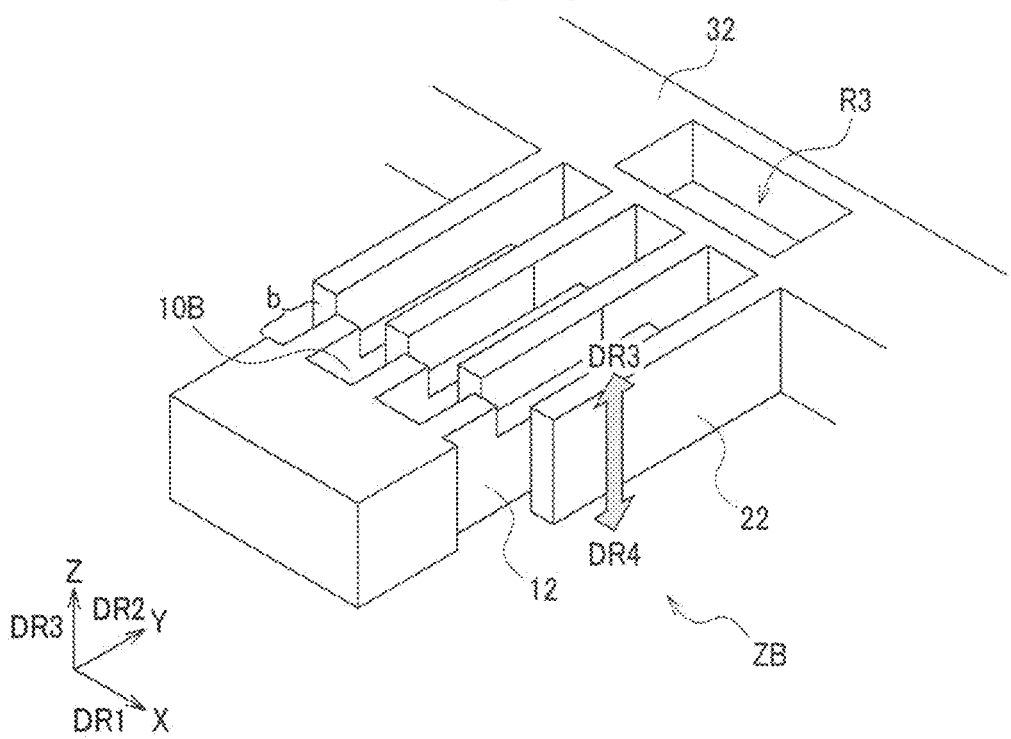
FIG. 3 is a perspective view showing a three-dimensional shape of a second recess.

Further, the fixed electrodes 12 of the second fixed electrode group 10B of the physical quantity sensor 1 shown in FIG. 1 are provided with a second recess R2. FIG. 3 is a perspective view showing a three-dimensional shape of the second recess R2. As shown in FIG. 3, a thickness of the fixed electrode 12 in the third direction DR3 is partially recessed. Specifically, in a region indicated by b in FIG. 3, the thickness of the fixed electrode 12 in the third direction DR3 is the same as a thickness of a base portion of a comb electrode of the second fixed electrode group 10B. However, a thickness of the fixed electrode 12 in the third direction DR3 other than the region indicated by b is smaller than the thickness thereof in the region indicated by b. The detector ZB includes the fixed electrode 12 and the movable electrode 22 having different thicknesses in the third direction DR3. The fixed electrodes 11 and 12 have thicknesses of, for example, about 10 μm to 40 μm.

Further, in the physical quantity sensor 1 shown in FIG. 1, a part of the second portion 32 of the frame unit 30 of the movable body MB is provided with a third recess R3. Specifically, as shown in the perspective view in FIG. 3, the third recess R3 is a recess having a shape in which a part of the second portion 32 of the frame unit 30 on a third direction DR3 side is recessed. As will be described in detail later with reference to FIGS. 14 to 22, in the embodiment, it is assumed that the first recess R1, the second recess R2, and the third recess R3 are formed by collective etching processing and have the same depth.

Figure 4:
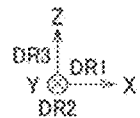
FIG. 4 is an explanatory diagram of operations of detectors.

FIG. 4 is an explanatory diagram of operations of the detectors ZA and ZB in the first detection element 100. FIG. 4 shows movements of the fixed electrodes 11 and 12 and the movable electrodes 21 and 22 in a cross-sectional view along an XZ plane when a direction of the acceleration is the third direction DR3 and when the direction of the acceleration is the fourth direction DR4 as a state where the acceleration is generated from an initial state on the left. The initial state is a state where the acceleration including gravity is not generated in the third direction DR3.

First, in the initial state, in both the detectors ZA and ZB, positions of end portions of the movable electrodes 21 and 22 and the fixed electrodes 11 and 12 on a fourth direction DR4 side coincide with each other and are flush with each other in a side view in the second direction DR2. As described above, since the movable electrode 21 of the movable electrode unit 20 is provided with the first recess R1, and the fixed electrode 12 of the fixed electrode unit 10 is provided with the second recess R2, as shown in the initial state, in the side view in the second direction DR2, the fixed electrodes 11 and 12 and the movable electrodes 21 and 22 are disposed such that positions of end portions thereof on the third direction DR3 side are not flush with each other.

Next, in a state where the acceleration in the third direction DR3 is generated, the movable electrode 21 of the detector ZA and the movable electrode 22 of the detector ZB receive an inertial force associated with the acceleration, and are displaced toward the fourth direction DR4 side. At this time, in the detector ZA, a facing area of the fixed electrode 11 and the movable electrode 21 in the first direction DR1 is reduced as the movable electrode 21 is displaced in the fourth direction DR4. In contrast, in the detector ZB, a facing area of the fixed electrode 12 and the movable electrode 22 in the first direction DR1 is maintained constant even when the movable electrode 22 is displaced in the fourth direction DR4 because the movable electrode 22 is not provided with the recess. In this way, when the acceleration is generated in the third direction DR3, the facing area is reduced in the detector ZA, and the facing area is maintained in the detector ZB.

Further, in a state where the acceleration in the fourth direction DR4 is generated, the movable electrode 21 of the detector ZA and the movable electrode 22 of the detector ZB receive the inertial force associated with the acceleration, and are displaced toward the third direction DR3 side. At this time, in the detector ZA, the facing area of the fixed electrode 11 and the movable electrode 21 in the first direction DR1 is maintained constant because the movable electrode 21 is provided with the first recess R1. In contrast, in the detector ZB, the facing area of the fixed electrode 12 and the movable electrode 22 in the first direction DR1 is reduced as the movable electrode 22 is displaced in the fourth direction DR4. In this way, when the acceleration is generated in the fourth direction DR4, the facing area is maintained in the detector ZA, and the facing area is reduced in the detector ZB.

In this way, when the acceleration in the third direction DR3 is generated, the facing area of the fixed electrode 11 and the movable electrode 21 in the detector ZA is reduced, and when the acceleration in the fourth direction DR4 is generated, the facing area of the fixed electrode 12 and the movable electrode 22 in the detector ZB is reduced. Therefore, the acceleration in the third direction DR3 and the fourth direction DR4 can be detected by detecting a decrease in the facing area in the detectors ZA and ZB as a change in a capacitance between the fixed electrode 14 and the movable electrode 24.

The fixed electrode 11 of the first fixed electrode group 10A and the movable electrode 21 of the first movable electrode group 20A are provided to face each other, and a parallel plate type capacitance is formed in the detector ZA. Similarly, the fixed electrode 12 of the second fixed electrode group 10B and the movable electrode 22 of the second movable electrode group 20B are provided to face each other, and a parallel plate type capacitance is formed in the detector ZB. For example, a change in the capacitance in the detector ZA can be detected as an N side, and a change in the capacitance in the detector ZB can be detected as a P side.

As shown when the direction of the acceleration is the third direction DR3 in FIG. 4, when the acceleration in the third direction DR3 is generated in the physical quantity sensor 1, the movable electrode 24 receives the inertial force and is displaced toward the fourth direction DR4 side. At this time, since the facing area in the detector ZB, that is, the facing area of fixed electrode 12 and the movable electrode 22 on the P side does not change, the capacitance thereof does not change. In contrast, the facing area in the detector ZA, that is, the facing area of the fixed electrode 11 and the movable electrode 21 on the N side is reduced. Therefore, a detection signal of the acceleration in the third direction DR3 can be obtained by detecting a difference between the capacitances on the P side and the N side by using a differential amplifier circuit QV (not shown). On the contrary, when the acceleration in the fourth direction DR4 is generated, the facing area in the detector ZB, that is, the facing area of the fixed electrode 12 and the movable electrode 22 on the P side is reduced, and the capacitance of the detector ZB is reduced, whereas the facing area in the detector ZA, that is, the facing area of the fixed electrode 11 and the movable electrode 21 on the N side does not change, and the capacitance of the detector ZA does not change. Therefore, a detection signal of the acceleration in the fourth direction DR4 can be obtained by detecting the difference by using the differential amplifier circuit QV. The detection of the capacitance can be implemented by, for example, coupling the first fixed electrode group 10A via a wiring LFA (not shown) and a pad PFA, coupling the second fixed electrode group 10B via a wiring LFB (not shown) and a pad PFB, and coupling the movable body MB via a wiring LV (not shown) and a pad PV, to the differential amplifier circuit QV (not shown).

In the description described above, the acceleration in the third direction DR3 and the fourth direction DR4 can be detected by providing the first recess R1 in the movable electrode 21 of the detector ZA and providing the second recess R2 in the fixed electrode 12 of the detector ZB, and the physical quantity sensor 1 according to the embodiment is not limited to this configuration. For example, the acceleration in the fourth direction DR4 can be detected in the detector ZA by providing the first recess R1 in the fixed electrode 11 of the detector ZA, and the acceleration in the third direction DR3 can be detected in the detector ZB by providing the second recess R2 in the movable electrode 22 of the detector ZB.

As described above, in the embodiment, the acceleration in the third direction DR3 and the fourth direction DR4 can be detected by providing the first recess R1 in the first movable electrode group 20A and providing the second recess R2 in the second fixed electrode group 10B. Here, when attention is paid to the movement of the movable body MB with the first direction DR1 as the rotation axis, there is a problem that whether the first recess R1 provided in the first movable electrode group 20A of the movable body MB affects the movement of the movable body MB. That is, since a weight of the frame unit 30 on the N side is reduced by a volume of the first recess R1 and a center of gravity balance of the movable body MB is poor, a failure may occur in the movement of the movable body MB.

First, when the moment of inertia I of the movable body MB around an X axis is considered, since the moment of inertia I is a product of a square of a distance from the rotation axis and a mass, the moment of inertia I is uniform along the X axis when the first recess R1 and the third recess R3 are not provided. However, the first movable electrode group 20A is provided with the first recess R1, and therefore the moment of inertia I is non-uniform along the X axis. Specifically, the moment of inertia I is reduced in a region where the first movable electrode group 20A is provided in the X axis because a mass is reduced due to the first recess R1, but does not change in a region where the second movable electrode group 20B is provided because no recess is provided therein. In this way, the moment of inertia I of the movable body MB is non-uniform along the X axis.

Figure 5:
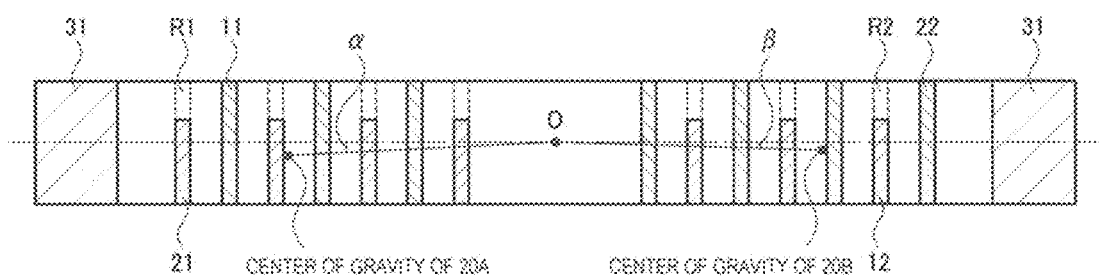
FIG. 5 is an explanatory diagram of an influence of mass non-uniformity of a movable body.
Figure 5:
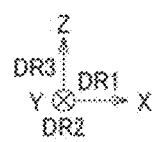
Figure 6:
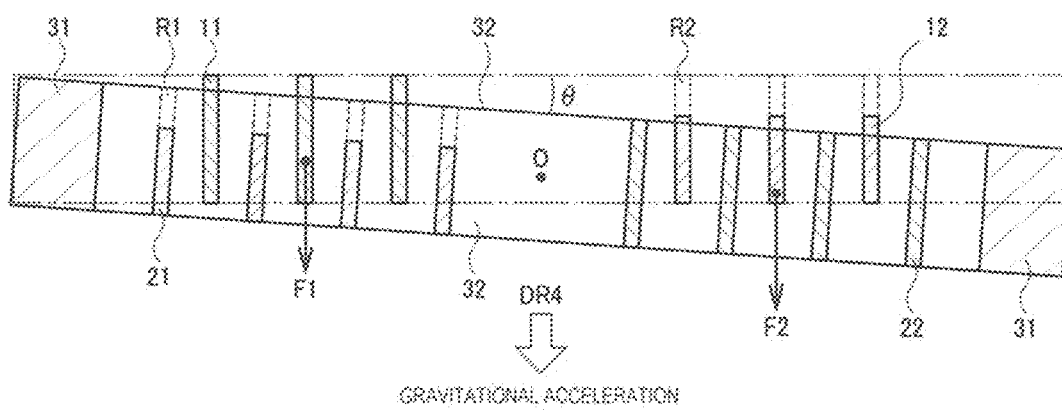
FIG. 6 is an explanatory diagram of an influence of the mass non-uniformity of the movable body.
Figure 6:
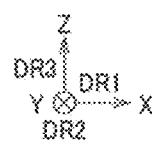
Figure 7:
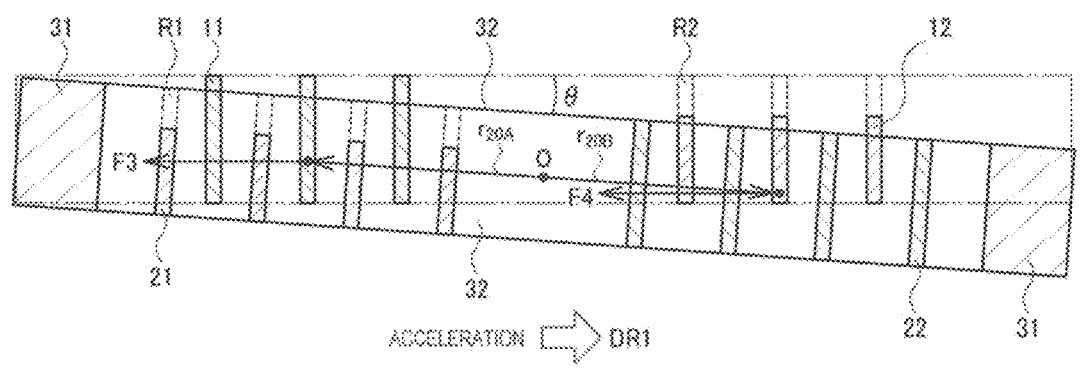
FIG. 7 is an explanatory diagram of an influence of the mass non-uniformity of the movable body.
Figure 7:
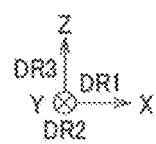

Next, with respect to a cross section along a line A-A' of the physical quantity sensor 1 in FIG. 1, a case where the third recess R3 is not provided in the frame unit 30 will be described with reference to FIG. 5. FIG. 5 shows a state of no gravity which means no gravitational acceleration in a Z direction is received. At this time, a line segment coupling a center O of the frame unit 30 and the first movable electrode group 20A intersects with the X axis at an angle α, and a line segment coupling the center O of the frame unit 30 and the second movable electrode group 20B intersects with the X axis at an angle R. Since the first movable electrode group 20A is provided with the first recess R1, the angle α has a constant value, and since the second movable electrode group 20B is provided with no recess, a center of gravity thereof is in the X axis, which means that the angle β is 0. FIG. 6 shows a cross section along the line A-A' of the physical quantity sensor 1 when receiving the gravitational acceleration in the Z direction. As described above, since the moment of inertia I is non-uniform along the X axis, an amount of displacement in the rotational movement with the X axis as the rotation axis is different between a region of the first movable electrode group 20A and a region of the second movable electrode group 20B. Therefore, a gravity F1 received by the first movable electrode group 20A associated with the acceleration is different from a gravity F2 received by the region of the second movable electrode group 20B. In this case, since a mass of the second movable electrode group 20B is larger, the gravity F2 is larger than the gravity F1. Here, since the support beams 42 and 43 coupling the movable body MB and the fixer 40 function as springs having a restoring force, the movable body MB is balanced by a constant elastic deformation of the support beams 42 and 43. Therefore, as shown in FIG. 6, an upper end surface and a lower end surface of the movable body MB are balanced while being slightly inclined by an angle θ with respect to the X-axis direction by the gravity F1 and the gravity F2 having different magnitudes. Therefore, the physical quantity sensor 1 slightly deviates from the rotational movement as shown in FIG. 4, which is ideal. The deviation particularly affects linearity of an acceleration sensitivity. However, the deviation of the linearity of the sensitivity can be corrected. In FIG. 6 and FIG. 7 to be described later, to visualize an influence of mass non-uniformity of the movable body MB, the deviation of the rotation axis described above is displayed to be large.

Then, a case where the movable body MB receiving the gravitational acceleration described with reference to FIG. 6 receives a force in a direction other than the Z direction, for example, the X direction to generate the acceleration will be considered. The movable body MB is coupled to the other ends of the support beams 42 and 43 each having one end fixed to the fixer 40 and can basically move only in the Z direction, and therefore the detection of the acceleration in the Z-axis direction is not affected even when the force in the X direction is received.

However, as described with reference to FIGS. 5 and 6, when the second portion 32 of the frame unit 30 is in a state of being inclined from the X axis by receiving the gravitational acceleration, it is necessary to consider a correlation between a position from the center O of the frame unit 30 to each portion of the movable body MB and the inertial force received by each portion of the movable body MB associated with the acceleration. Specifically, a torque obtained by an outer product of a position vector from the center O of the frame unit 30 to each portion of the movable body MB and an inertial force vector received by each portion of the movable body MB associated with the acceleration in the X direction is considered. FIG. 7 shows, by vectors, inertial forces applied to a portion of the first movable electrode group 20A and a portion of the second movable electrode group 20B of the physical quantity sensor 1 in a state where the acceleration in the first direction DR1 is generated. An inertial force F3 applied to the portion of the first movable electrode group 20A in which the first recess R1 is provided is a vector in a –X direction, and an inertial force F4 applied to the portion of the second movable electrode group 20B in which no recess is provided is also a vector in the –X direction. Therefore, for the first movable electrode group 20A, an outer product of the vector of the inertial force F3 in the –X direction and a position vector $r_{20A}$ from the center O is represented by $r_{20A}F3 \sin\theta$. Meanwhile, for the second movable electrode group 20B, an outer product of the vector of the inertial force F4 in the –X direction and a position vector $r_{20B}$ from the center O is represented by $r_{20B}F4 \sin(\pi+\theta)$. However, at this time, the angle θ at which an upper end and a lower end of the movable body MB intersect with the X axis is much larger than the angle α and the angle β in FIG. 5. That is, θ>>α and β. Since distances from the center O to the movable electrode groups are equal, when $r_{20A}=r_{20B}=r$, a torque received by movable body MB with the fixer 40 as a center is represented as $r(F3-F4)\sin\theta$. Here, in the first movable electrode group 20A in which the first recess R1 is provided and the second movable electrode group 20B in which no recess is provided, the mass of the second movable electrode group 20B is larger. Therefore, the inertial force F4 received by the second movable electrode group 20B is larger than the inertial force F3 received by the first movable electrode group 20A, and the torque $r(F3-F4)\sin\theta$ is a negative value. Therefore, the torque $r(F3-F4)\sin\theta$ with the Y-axis direction as the rotation axis is applied to the movable body MB. Therefore, in addition to the acceleration in the Z direction with the X axis as the rotation axis of the physical quantity sensor 1, which is originally intended, a component of the rotational movement with a Y axis as the rotation axis is generated.

In this way, when the moment of inertia I of the movable body MB is non-uniform in the X axis, unnecessary rotational movement of the physical quantity sensor 1 may occur in combination with the elasticity of the support beams 42 and 43, and the cross-axis sensitivity may be increased. Particularly, in a state where the gravitational acceleration is received in the Z direction, this phenomenon is remarkable. The cross-axis sensitivity refers to a sensitivity obtained by detecting a physical quantity other than a detection target direction of the physical quantity sensor as a physical quantity in the detection target direction.

A physical quantity sensor disclosed in JP-T-2018-515353 includes a rotor corresponding to the movable body MB and a plurality of stators corresponding to the fixed electrode unit 10, and the rotor and the plurality of stators are at least partially recessed in a thickness in the Z direction. Therefore, the moment of inertia I with respect to a rotation axis of the rotor may be non-uniform, and the cross-axis sensitivity may increase as described above. In this way, in the physical quantity sensor that detects the acceleration in the Z direction, when the thicknesses of the fixed electrode 14 and the movable electrode 24 in the third direction DR3 are made different from each other, there is a problem that the moment of inertia I of the movable body MB including the movable electrode unit 20 is non-uniform, the cross-axis sensitivity increases, and detection accuracy of the physical quantity sensor deteriorates.

Regarding this point, according to the embodiment, as described above, the second portion 32 of the frame unit 30 of the movable body MB is provided with the third recess R3. The third recess R3 is provided in the second portion 32 of the frame unit 30 on the first direction DR1 side. In the physical quantity sensor 1, since the first recess R1 is provided in the second portion 32 of the frame unit 30 on a side in a direction opposite to the first direction DR1, the moment of inertia I of the movable body MB is non-uniform along the first direction DR1. Therefore, by providing the third recess R3 at a region of the second portion 32 where the second movable electrode group 20B is provided on a side opposite to the first movable electrode group 20A in the X axis and that is opposite to a position where the first recess R1 is provided, the non-uniformity of the moment of inertia I of the movable body MB can be eliminated. That is, by providing the third recess R3, the non-uniformity of the mass of the second portion of the frame unit 30 in the first direction DR1 is eliminated. Therefore, the deviation of the rotational movement of the physical quantity sensor 1 caused by the acceleration in the third direction DR3 can be corrected. A shape of the third recess R3 can be appropriately designed. For example, the shape of the third recess R3 in a plan view may be rectangular or circular. In addition, as described in a first detailed example to be described later, the third recess R3 can be provided discretely.

As described above, the physical quantity sensor 1 according to the embodiment includes the fixer 40 fixed to the substrate 2, the fixed electrode unit 10 provided at the substrate 2 and including the first fixed electrode group 10A and the second fixed electrode group 10B, the support beams 42 and 43 each having one end coupled to the fixer 40, and the movable body MB. The movable body MB includes the movable electrode unit 20 including the first movable electrode group 20A and the second movable electrode group 20B, and the frame unit 30 coupling the movable electrode unit 20 and the other ends of the support beams 42 and 43. The movable electrode unit 20 includes the first movable electrode group 20A in which the movable electrodes 21 respectively face the fixed electrodes 11 of the first fixed electrode group 10A, and the second movable electrode group 20B in which the movable electrodes 22 respectively face the fixed electrodes 12 of the second fixed electrode group 10B. The first movable electrode group 20A is provided with the first recess R1 recessed in the third direction DR3, the second fixed electrode group 10B is provided with the second recess R2 recessed in the third direction DR3, and the region of the frame unit 30 on a second movable electrode group 20B side is provided with the third recess R3 recessed in the third direction DR3.

In this way, since the first recess R1 and the third recess R3 have the same area and the same depth, the non-uniformity of the mass of the movable body MB of the physical quantity sensor 1 on an axis in the first direction DR1 is eliminated. Therefore, the center of gravity of the physical quantity sensor in the third direction DR3 does not deviate. Therefore, the displacement when the physical quantity, for example, the acceleration other than the third direction DR3 is applied can be prevented. Therefore, the cross-axis sensitivity of the physical quantity sensor 1 can be reduced, and the detection accuracy of the physical quantity can be improved. In addition, the excellent physical quantity sensor having high long-term reliability in which unnecessary vibration due to the vibration or an impact from an outside is less likely to occur can be provided.

In the embodiment, the first recess R1 and the third recess R3 can have the same area in a plan view in the third direction DR3. In this way, by making the depths of the first recess R1 and the third recess R3 the same, the non-uniformity of the moment of inertia I in the first direction DR1 with the first direction DR1 as the rotation axis can be eliminated, and the detection accuracy of the physical quantity sensor 1 can be improved.

Figure 20:
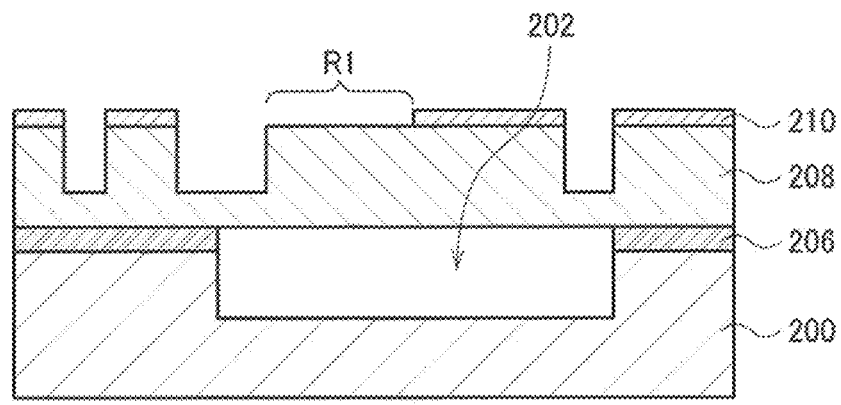
FIG. 20 is an explanatory diagram of a method for manufacturing the physical quantity sensor according to the embodiment.
Figure 21:
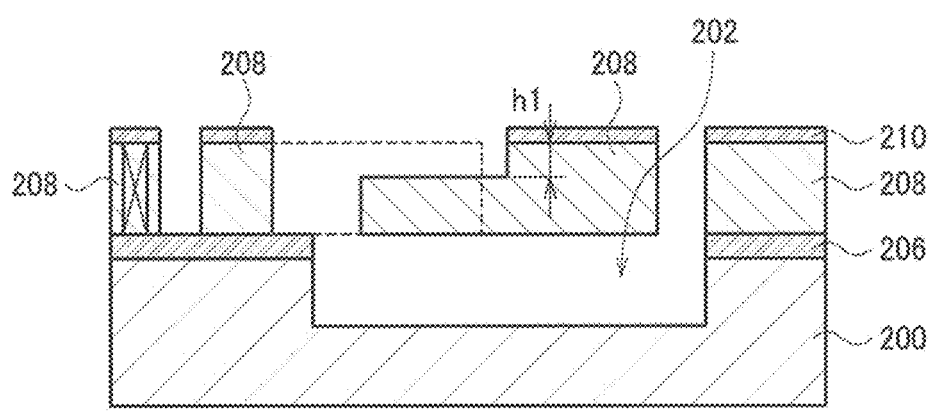
FIG. 21 is an explanatory diagram of a method for manufacturing the physical quantity sensor according to the embodiment.

As will be described later with reference to FIGS. 20 and 21, the first recess R1 of the first movable electrode group 20A and the third recess R3 of the frame unit 30 can be provided by etching the same silicon deposition layer. Therefore, when the first recess R1 and the third recess R3 are designed to have the same area in the plan view in the third direction DR3, silicon layer processing is performed, by a common etching step, in the first recess R1 and the third recess R3 by the same depth, and volumes of the first recess R1 and the third recess R3 can be made equal to each other. Alternatively, the first recess R1 and the third recess R3 can be individually etched and processed by the same depth. In this way, the non-uniformity of the mass of the movable body MB of the physical quantity sensor 1 in the axis in the first direction DR1 can be eliminated. Since dimensions in a semiconductor manufacturing process vary by about ±10% to ±20% due to a process variation, the same area described above includes a case where the areas are substantially the same. When the third recess R3 is divided, the area thereof refers to a total area of the divided third recess R3 in the plan view in the third direction DR3. In this way, the term same according to the embodiment includes a case of substantially the same. For example, the areas, the volumes, and the lengths according to the embodiment may be the same as design values, and may be substantially the same within a range of error due to a variation or a tolerance of the Further, in the embodiment, the first recess R1 and the third recess R3 may have the same depth in the third direction DR3. In this way, by making the areas of the first recess R1 and the third recess R3 equal to each other in the plan view in the third direction DR3, the volumes of the first recess R1 and the third recess R3 can be made equal to each other. Therefore, the non-uniformity of the moment of inertia I in the first direction DR1 with the first direction DR1 as the rotation axis can be eliminated, and the detection accuracy of the physical quantity of the physical quantity sensor 1 can be improved.

As described above, when the areas of the first recess R1 and the third recess R3 are the same as each other in the plan view in the third direction DR3 and the depths of the first recess R1 and the third recess R3 are the same as each other, the volumes of the first recess R1 and the third recess R3 are the same as each other. Since the first recess R1 and the third recess R3 are provided by processing the silicon deposition layer, the first recess R1 and the third recess R3 have the same mass of portions that disappear due to the processing. Therefore, the non-uniformity of the volume of the movable body MB in the X axis is eliminated, and the above-described effects are achieved. The depths of the first recess R1, the second recess R2, and the third recess R3 described above refer to depths by which the processing is performed from an outermost layer of a wafer 208 in FIG. 20 to be described later.

In the embodiment, the first recess R1 and the third recess R3 can have the same volume. In this way, the non-uniformity of the moment of inertia I in the first direction DR1 with the first direction DR1 described above as the rotation axis can be eliminated, and the detection accuracy of the physical quantity sensor 1 can be improved. Here, the volume refers to a volume corresponding to a portion of the silicon deposition layer originally present when the first recess R1 and the third recess R3 are formed by processing such as etching.

2. Detailed Configuration Example

Figure 8:
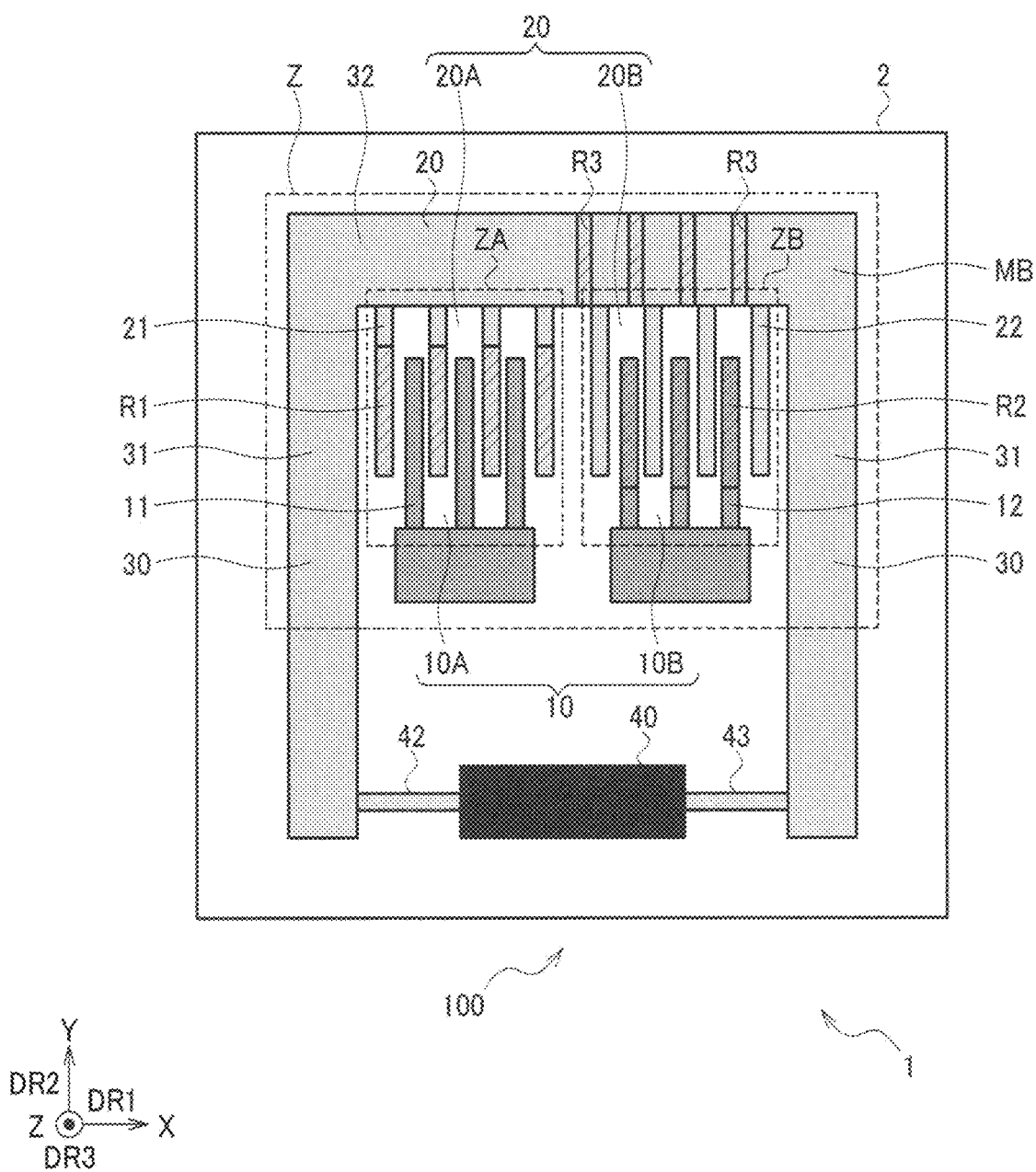
FIG. 8 is a plan view showing a first detailed example of the physical quantity sensor.

FIG. 8 is a plan view of a first detailed example according to the embodiment. A configuration of the third recess R3 is different from the configuration example shown in FIG. 1. Specifically, the third recess R3 in the first detailed example is divided into four divided recesses in a plan view in the third direction DR3. Each of the divided recesses has a rectangular shape with the second direction DR2 as a longitudinal direction in the plan view in the third direction.

As described above, in the physical quantity sensor 1 according to the embodiment, the volumes of the first recess R1 and the third recess R3 are made equal to each other, and the moment of inertia I of the movable body MB along the first direction DR1 is made uniform, thereby improving the detection accuracy of the physical quantity in the third direction DR3. Therefore, for example, when the areas of the first recess R1 and the third recess R3 in the plan view in the third direction DR3 are designed to be equal to each other, the volumes of the first recess R1 and the third recess R3 can be made equal to each other when the first recess R1 and the third recess R3 are processed to have the same depth.

Here, when opening patterns of the first recess R1 and the third recess R3 in the plan view in the third direction DR3 are different from each other, even when etching processing is performed under the same etching condition, a microloading effect is known in which a difference occurs in etching rates in the recesses. Even when the first recess R1 and the third recess R3 have the same opening pattern in the plan view, a difference in a surrounding exposure pattern and a difference in a position in a wafer or a chip also affect the etching rates of the recesses. Therefore, it does not mean that the volumes of the recesses are equal to each other when the area of the first recess R1 in the plan view and a total area of the divided recesses of the third recess R3 are set to be the same and the etching processing is performed under conditions such as the same gas atmosphere for the same time.

When the physical quantity sensor 1 shown in FIG. 1 is examined from such a viewpoint, the third recess R3 is a single recess which is not divided, and has a rectangular shape with a wide opening in the plan view in the third direction DR3. In contrast, the first recess R1 is originally a part of a thin pattern of the movable electrode 21 of the first movable electrode group 20A, and has a pattern in which a plurality of rectangular shapes with the second direction DR2 as the longitudinal direction are disposed in the plan view. It is assumed that while the third recess R3 is formed by processing a part of a silicon deposition layer, a periphery of the first recess R1 is generally made of a material other than the silicon deposition layer. As described above, the first recess R1 and the third recess R3 are different from each other in a processing pattern or the material around the recess. Therefore, even when the first recess R1 and the third recess R3 are processed under the same etching condition for the same time, the depth of each recess is not the same. In this case, even when the areas of the first recess R1 and the third recess R3 in the plan view are designed to be equal to each other, the volumes of the recesses are not equal to each other. Meanwhile, in the physical quantity sensor 1 according to the embodiment, it is assumed that the first recess R1, the second recess R2, and the third recess R3 are collectively etched by using a photolithography method, such that the first recess R1, the second recess R2, and the third recess R3 have the same depth. Therefore, in the configuration example shown in FIG. 1 in which the third recess R3 is not divided, when the first recess R1 and the third recess R3 are collectively processed, the non-uniformity of the moment of inertia I of the movable body MB in the direction along the first direction DR1 cannot be eliminated. Therefore, the detection accuracy of the physical quantity is not sufficiently improved.

In this regard, according to the first detailed example, the third recess R3 is divided into the four divided recesses. Therefore, by adjusting the pattern of the third recess R3 in the plan view, the etching rate of the first recess R1 and the etching rate of the third recess R3 can be optimized to be close to each other, and the recesses can be processed by the same depth by collective processing under the same etching condition. Specifically, when the etching rate of the third recess R3 is lower than the etching rate of the first recess R1, the etching rate of the third recess R3 can be increased by, for example, increasing a width of each of the divided recesses of the third recess R3 in the first direction in the plan view in the third direction DR3 to decrease an aspect ratio of the third recess R3. In addition, it is considered that the etching rate of the third recess R3 can be adjusted even by adjusting an interval between the divided recesses of the third recess R3. In the first detailed example, the third recess R3 is divided into four portions, and the number of divisions may be increased or decreased.

As described above, according to the embodiment, the third recess R3 can be provided by being divided into a plurality of divided recesses. In this way, the etching rates of the first recess R1 and the third recess R3 can be adjusted to be close to each other by adjusting the pattern of the third recess R3. Therefore, the first recess R1 and the third recess R3 can be processed to the same depth by the collective processing. Therefore, the non-uniformity of the moment of inertia I of the movable body MB in the first direction DR1 can be eliminated by a simpler process, and the detection accuracy of the physical quantity can be improved. For a depth of the divided recess, when the divided recesses are processed to penetrate the second portion 32 of the frame unit 30, rigidity of the frame unit 30 may be deteriorated. In addition, in this case, the frame unit 30 itself is likely to be twisted, and a problem also occurs when high-frequency vibration is applied.

In the first detailed example, a width of the divided recess in the first direction DR1 can be the same as a width of the movable electrode 21 of the first movable electrode group 20A in the first direction DR1. In this way, for example, when the first recess R1 is implemented by four rectangular shapes in FIG. 8, the non-uniformity of the mass of the movable body MB in the first direction DR1 can be eliminated by providing four divided recesses having the same width as the rectangular shape in the third recess.

In the first detailed example, the total area of the plurality of divided recesses can be the same as the area of the first recess R1 in the plan view in the third direction DR3. As described above, according to the first detailed example, the etching rate of the third recess can be adjusted by changing the pattern of the third recess in the plan view in the third direction DR3, and therefore the etching rates of the first recess R1 and the third recess R3 can be made close to each other. Therefore, when the total area of the plurality of divided recesses of the third recess R3 and the area of the first recess R1 are the same in the plan view in the third direction DR3, and when the recesses are processed to have the same depth, the volumes of the recesses are the same. Therefore, the first recess R1 and the third recess R3 can be processed by the collective etching processing such that the volumes of the first recess R1 and the third recess R3 are the same. Therefore, an effect of improving the detection sensitivity of the physical quantity of the physical quantity sensor 1 by a simpler and low-cost manufacturing process can be implemented.

Further, in the embodiment, a length of the first recess R1 in the second direction DR2 can be the same as a length of the movable electrode 21 of the first movable electrode group 20A in the second direction DR2. For example, in the first detailed example shown in FIG. 8, a hatched region of the first recess R1 may extend over all the comb-shaped movable electrodes 21.

As described above, the physical quantity sensor 1 according to the embodiment detects a change in a facing area of the fixed electrode 14 and the movable electrode 24 as a change in capacitance, and detects the physical quantity. Therefore, by providing a large region of the first recess R1 as in the embodiment, a large facing area of the fixed electrode 11 and the movable electrode 21 can be ensured. Therefore, the acceleration can be detected as a larger change in the capacitance, and the detection sensitivity of the physical quantity of the physical quantity sensor 1 can be improved. The above configuration can also be applied to the detector ZB. For example, a hatched region of the second recess R2 in FIG. 8 may extend over all the fixed electrodes 12. In this way, even in the detector ZB, a large facing area of the fixed electrode 12 and the movable electrode 22 can be ensured, and the acceleration can be detected as a larger change in the capacitance.

Figure 9:
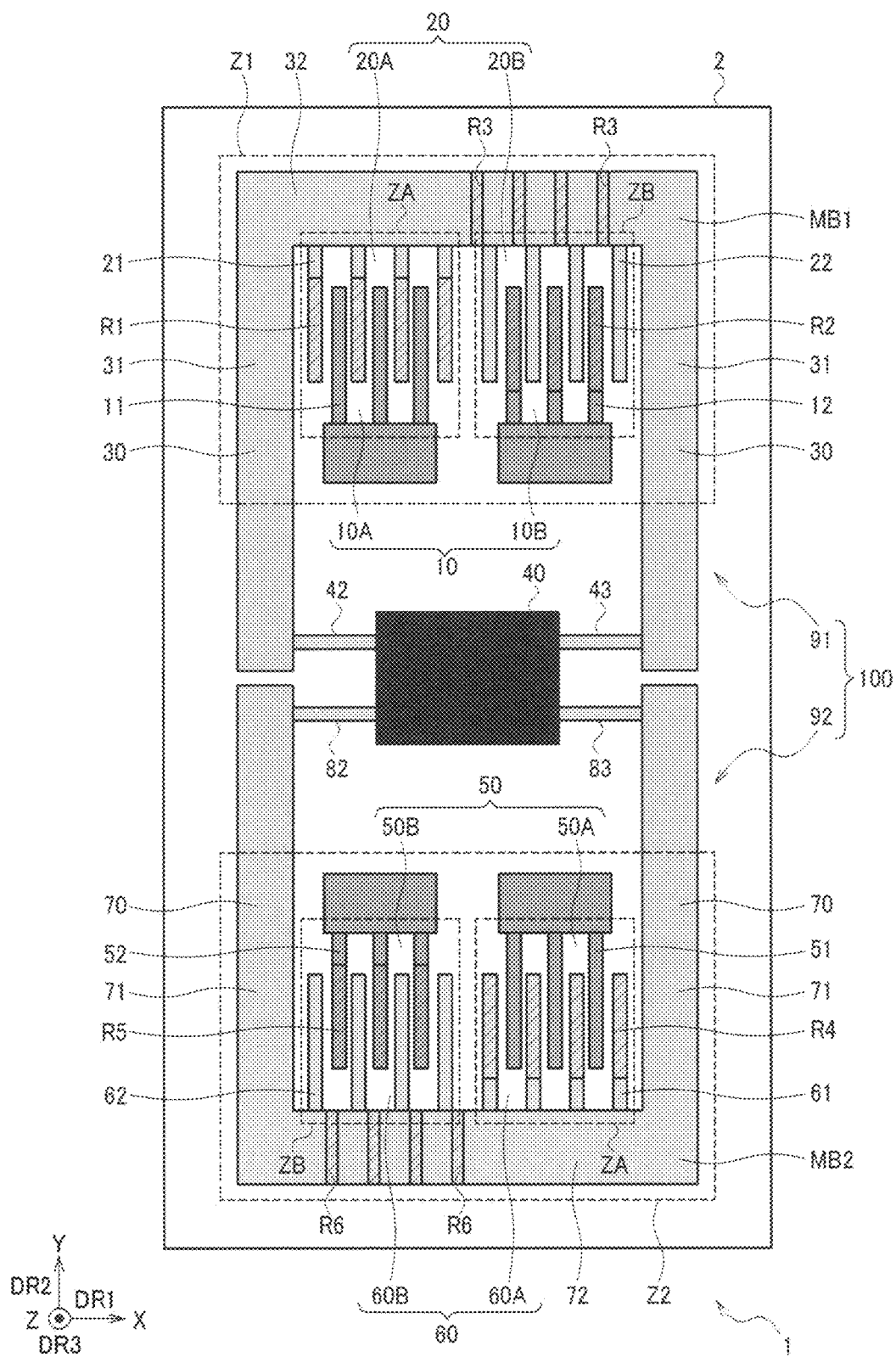
FIG. 9 is a plan view showing a second detailed example of the physical quantity sensor.

FIG. 9 is a plan view of a second detailed example according to the embodiment. A configuration of the first detection element 100 is different from that of the configuration example in FIG. 1 and that of the first detailed example in FIG. 8. Specifically, in the second detailed example, the first detection element 100 includes a first element unit 91 and a second element unit 92. The first element unit 91 and the second element unit 92 are provided such that the first element unit 91 is provided on a second direction DR2 side, and the second element unit 92 is provided on a side in a direction opposite to the second direction DR2 using the fixer 40 as a common anchor. The detectors ZA and ZB respectively corresponding to the N side and the P side are provided in each of the element units, and the physical quantity in the third direction DR3 can be detected.

The first element unit 91 has the same configuration as the first detection element 100 in the configuration example and the first detailed example in FIG. 1. The second element unit 92 includes a fixed electrode unit 50 including a first fixed electrode group 50A and a second fixed electrode group 50B, a second movable body MB2, and support beams 82 and 83. Here, in the second detailed example, to distinguish a movable body of the first element unit 91 from the movable body of the second element unit 92, the movable body of the first element unit 91 is described as a first movable body MB1. The second movable body MB2 includes a movable electrode unit 60 including a first movable electrode group 60A and a second movable electrode group 60B, and a frame unit 70.

The fixed electrode unit 50, the first fixed electrode group 50A, and the second fixed electrode group 50B of the second element unit 92 correspond to the fixed electrode unit 10, the first fixed electrode group 10A, and the second fixed electrode group 10B of the first element unit 91, respectively. The fixed electrode unit 10 includes the second fixed electrode group 10B corresponding to the P side and the first fixed electrode group 10A corresponding to the N side, and the first fixed electrode group 10A and the second fixed electrode group 10B include the fixed electrodes 11 and 12, respectively. The fixed electrode unit 50 includes the second fixed electrode group 50B corresponding to the P side and the first fixed electrode group 50A corresponding to the N side are provided, and the first fixed electrode group 50A and the second fixed electrode group 50B include fixed electrodes 51 and 52, respectively.

The movable electrode unit 60, the first movable electrode group 60A, and the second movable electrode group 60B of the second element unit 92 correspond to the movable electrode unit 20, the first movable electrode group 20A, and the second movable electrode group 20B of the first element unit 91, respectively. The movable electrode unit 20 includes the second movable electrode group 20B corresponding to the P side and the first movable electrode group 20A corresponding to the N side, and the first movable electrode group 20A and the second movable electrode group 20B include the movable electrodes 21 and 22, respectively. The movable electrode unit 60 includes the second movable electrode group 60B corresponding to the P side and the first movable electrode group 60A corresponding to the N side, and the first movable electrode group 60A and the second movable electrode group 60B include movable electrodes 61 and 62, respectively. The movable electrodes 21 and 22 extend from the second portion 32 of the frame unit 30 and are respectively disposed to face the fixed electrodes 11 and 12. The movable electrodes 61 and 62 extend from a second portion 72 of the frame unit 70 and are respectively disposed to face the fixed electrodes 51 and 52. As in the configuration examples shown in FIGS. 1 and 8, the electrodes are coupled to a differential amplifier circuit QV (not shown). The support beams 82 and 83 of the second element unit 92 respectively correspond to the support beams 42 and 43 of the first element unit 91, and the frame unit 70 of the second element unit 92 corresponds to the frame unit 30 of the first element unit 91. With such a configuration, in the second detailed example, the acceleration in the third direction DR3 can be detected by each of the first element unit 91 and the second element unit 92.

A first recess R4 is provided in the first movable electrode group 60A of the second element unit 92, a second recess R5 is provided in the second fixed electrode group 50B, and a third recess R6 is provided in the second portion 72 of the frame unit 70. Further, the first recess R4, the second recess R5, and the third recess R6 of the second element unit 92 correspond to the first recess R1, the second recess R2, and the third recess R3 of the first element unit 91, respectively.

In this way, the second element unit 92 is provided with the first recess R4 and the third recess R6 corresponding to the first recess R1 and the third recess R3 of the first element unit 91, and the non-uniformity of the mass of the second movable body MB2 can be eliminated. Therefore, the cross-axis sensitivity is reduced in each element unit, and the detection sensitivity is improved by providing the two element units while implementing the detection of the physical quantity with high accuracy. In addition, occurrence of the unnecessary vibration due to vibration or impact from the outside can be avoided, and the excellent physical quantity sensor 1 having high long-term reliability can be provided.

Figure 10:
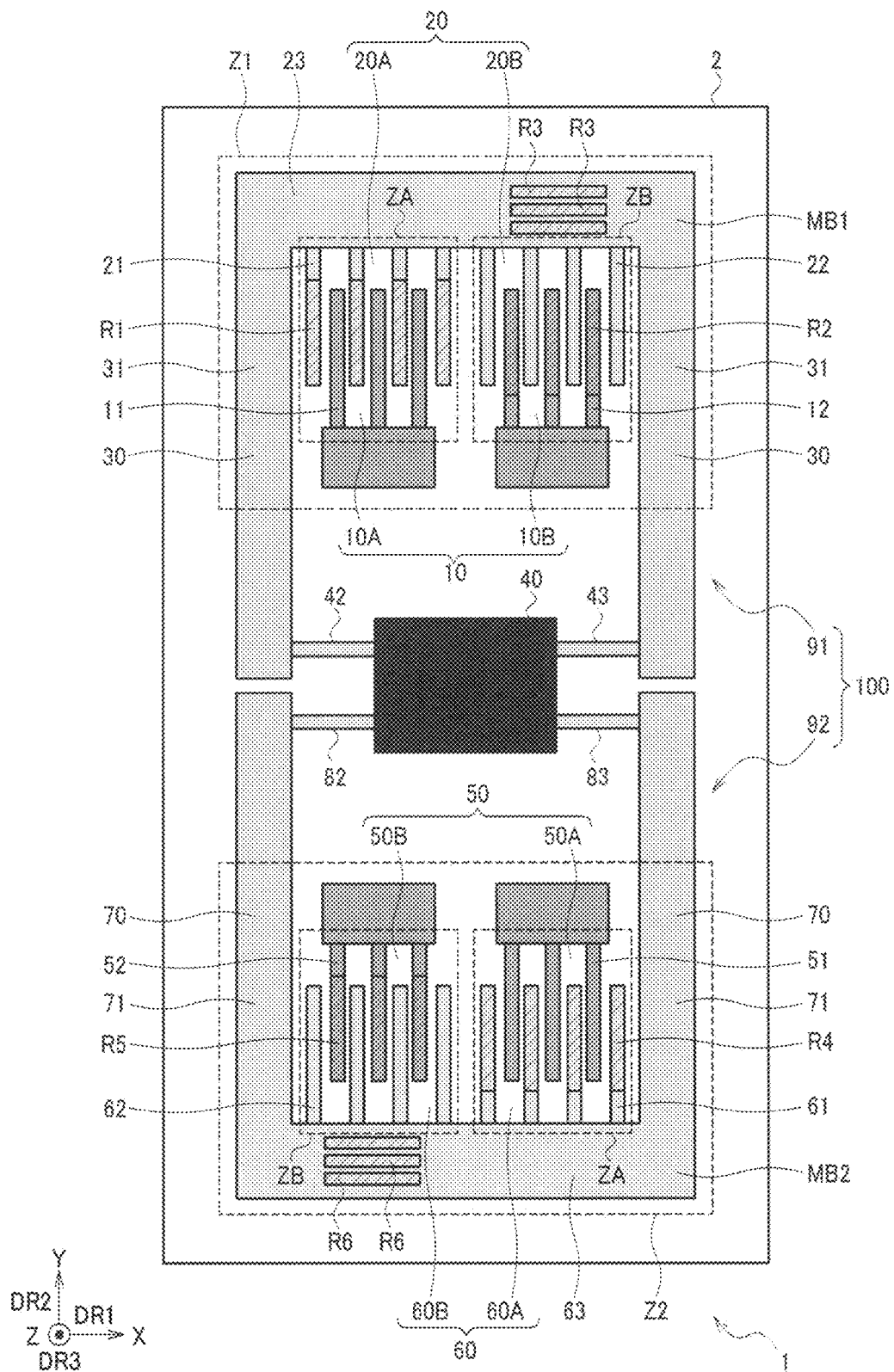
FIG. 10 is a plan view showing a modification of the second detailed example of the physical quantity sensor.

FIG. 10 is a plan view of a modification of the second detailed example according to the embodiment. A pattern of the third recess in a plan view is different from that in the second detailed example. Specifically, the pattern of the third recess R3 of the second detailed example is a plurality of divided recesses each having a rectangular shape with the first direction DR1 as the longitudinal direction in the present modification. The effect obtained by providing the plurality of divided recesses described above can be obtained even when the third recess R3 is provided as in the embodiment.

Further, in the embodiment, the movable body MB can include the first portions 31 having one ends coupled to the other ends of the support beams 42 and 43 and extending with the second direction as the long-side direction, and the second portion 32 coupled to one ends of the first portions 31 and extending with the first direction DR1 as the long-side direction.

In this way, in the physical quantity sensor 1 shown in FIG. 1 and the like, the movable body MB having a substantial U-shape can be formed. As described above, the movable body MB can perform a rotational movement via the support beams 42 and 43 with the first direction DR1 as a rotation axis, and the physical quantity sensor 1 can detect the acceleration in the third direction DR3.

In the embodiment, the movable electrode unit 20 is coupled to the second portion 32.

In this way, the movable electrode unit 20 can move integrally with the second portion 32 of the frame unit 30. Therefore, the physical quantity sensor 1 can detect the acceleration in the third direction DR3 by the movement of the movable body MB with the first direction DR1 as the rotation axis.

In the embodiment, the third recess R3 is provided in the second portion 32. In this way, a part of a volume of the second portion 32 of the frame unit 30 can be reduced. Therefore, the non-uniformity of the mass of the movable body MB along the first direction DR1 due to the provision of the first recess R1 can be eliminated, and the detection accuracy of the physical quantity of the physical quantity sensor 1 can be improved.

3. Inertial Measurement Unit

Figure 11:
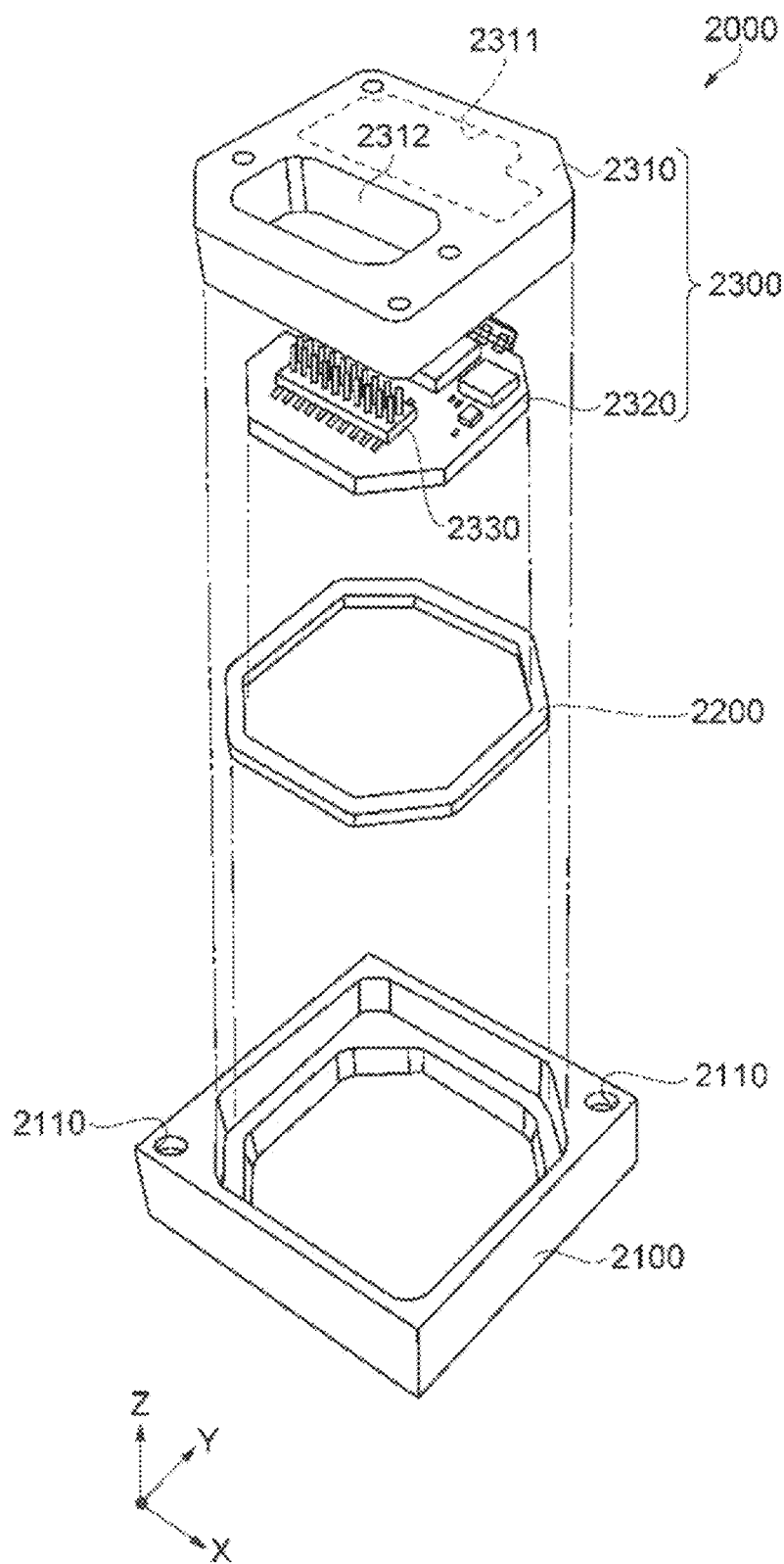
FIG. 11 is an exploded perspective view showing a schematic configuration of an inertial measurement unit including the physical quantity sensor.

Next, an example of an inertial measurement unit 2000 according to the embodiment will be described with reference to FIGS. 11 and 12. The inertial measurement unit (IMU) 2000 shown in FIG. 11 is a unit that detects an inertial movement amount of a posture or a behavior of a moving body such as an automobile or a robot. The inertial measurement unit 2000 is a so-called six-axis motion sensor including an acceleration sensor that detects acceleration ax, ay, and az in directions along three axes and an angular velocity sensor that detects angular velocities ωx, ω, and ωz around the three axes.

The inertial measurement unit 2000 is a rectangular parallelepiped having a substantially square planar shape. Screw holes 2110 as mount portions are formed in the vicinity of 2 vertexes positioned in a diagonal direction of the square. Two screws can be inserted into the two screw holes 2110 to fix the inertial measurement unit 2000 to a mounted surface of a mounted body such as an automobile. It is also possible to reduce a size to a degree that can be mounted on a smartphone or a digital camera, for example, by selecting a component or changing a design.

The inertial measurement unit 2000 includes an outer case 2100, a bonding member 2200, and a sensor module 2300, and has a configuration in which the sensor module 2300 is inserted inside the outer case 2100 with the bonding member 2200 interposed therebetween. The sensor module 2300 includes an inner case 2310 and a circuit board 2320. The inner case 2310 is formed with a recess 2311 for preventing contact with the circuit board 2320 and an opening 2312 for exposing a connector 2330 to be described later. Further, the circuit board 2320 is bonded to a lower surface of the inner case 2310 via an adhesive.

Figure 12:
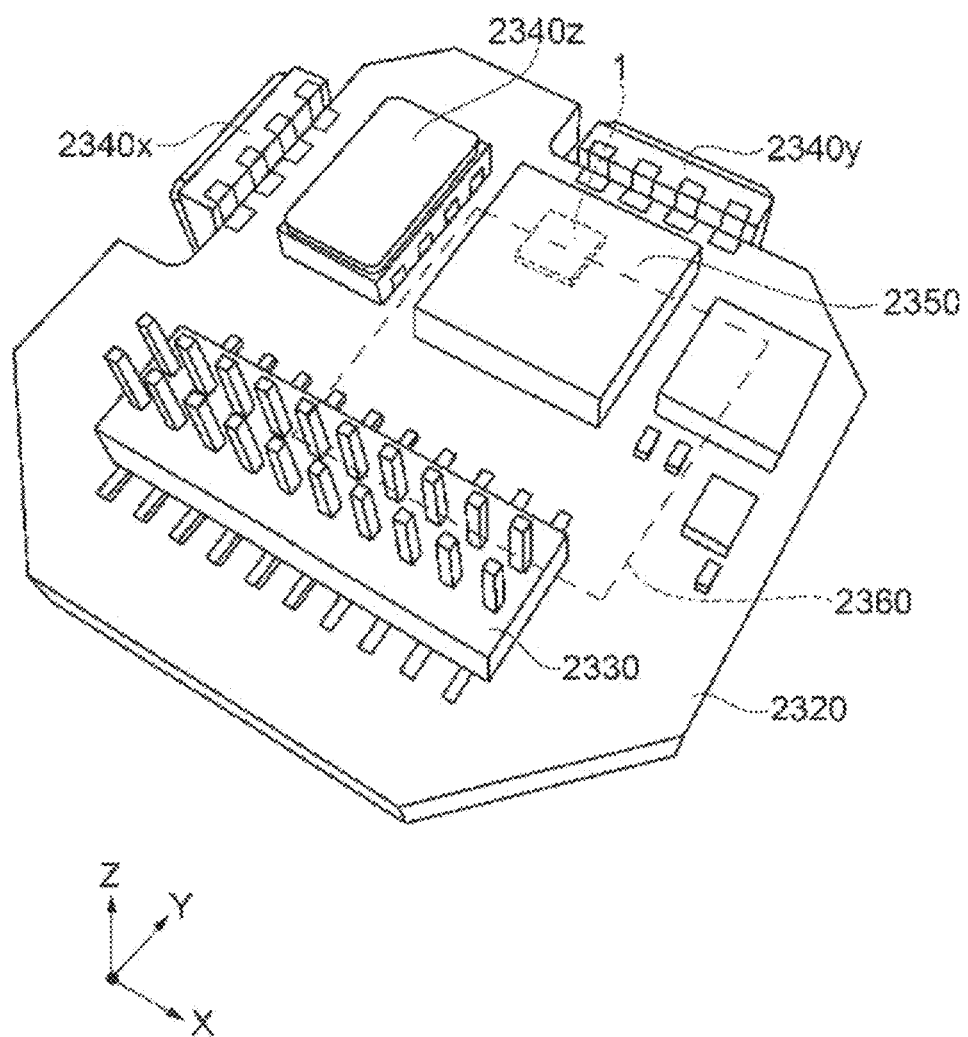
FIG. 12 is a perspective view of a circuit board of the inertial measurement unit.

As shown in FIG. 12, the connector 2330, an angular velocity sensor 2340z that detects an angular velocity around a Z axis, an acceleration sensor unit 2350 that detects acceleration in each axial direction of an X axis, a Y axis, and the Z axis, and the like are mounted at an upper surface of the circuit board 2320. Further, an angular velocity sensor 2340x that detects an angular velocity around the X axis and an angular velocity sensor 2340y that detects an angular velocity around the Y axis are mounted at side surfaces of the circuit board 2320.

The acceleration sensor unit 2350 includes at least the physical quantity sensor 1 for measuring the acceleration in the Z-axis direction described above, and can detect acceleration in one axial direction or acceleration in two axial directions or three axial directions as necessary. The angular velocity sensors 2340x, 2340y, and 2340z are not particularly limited, and for example, a vibration gyro sensor using a Coriolis force can be used.

Further, a control IC 2360 is mounted at a lower surface of the circuit board 2320. The control IC 2360 that performs control based on a detection signal output from the physical quantity sensor 1 as a controller is, for example, a micro controller unit (MCU), includes a storer including a non-volatile memory, an A/D converter, and the like therein, and controls each unit of the inertial measurement unit 2000. In addition, a plurality of electronic components are mounted at the circuit board 2320.

As described above, the inertial measurement unit 2000 according to the embodiment includes the physical quantity sensor 1 and the control IC 2360 that performs the control based on the detection signal output from the physical quantity sensor 1 as the controller. According to the inertial measurement unit 2000, since the acceleration sensor unit 2350 including the physical quantity sensor 1 is used, an effect of the physical quantity sensor 1 can be enjoyed, and the inertial measurement unit 2000 capable of implementing high accuracy and the like can be provided.

The inertial measurement unit 2000 is not limited to the configurations in FIGS. 11 and 12. For example, only the physical quantity sensor 1 may be provided as the inertial sensor without providing the angular velocity sensors 2340x, 2340y, and 2340z in the inertial measurement unit 2000. In this case, for example, the inertial measurement unit 2000 may be implemented by housing the physical quantity sensor 1 and the control IC 2360 which implements the controller in a package that is a housing container.

4. Manufacturing Method

Figure 13:
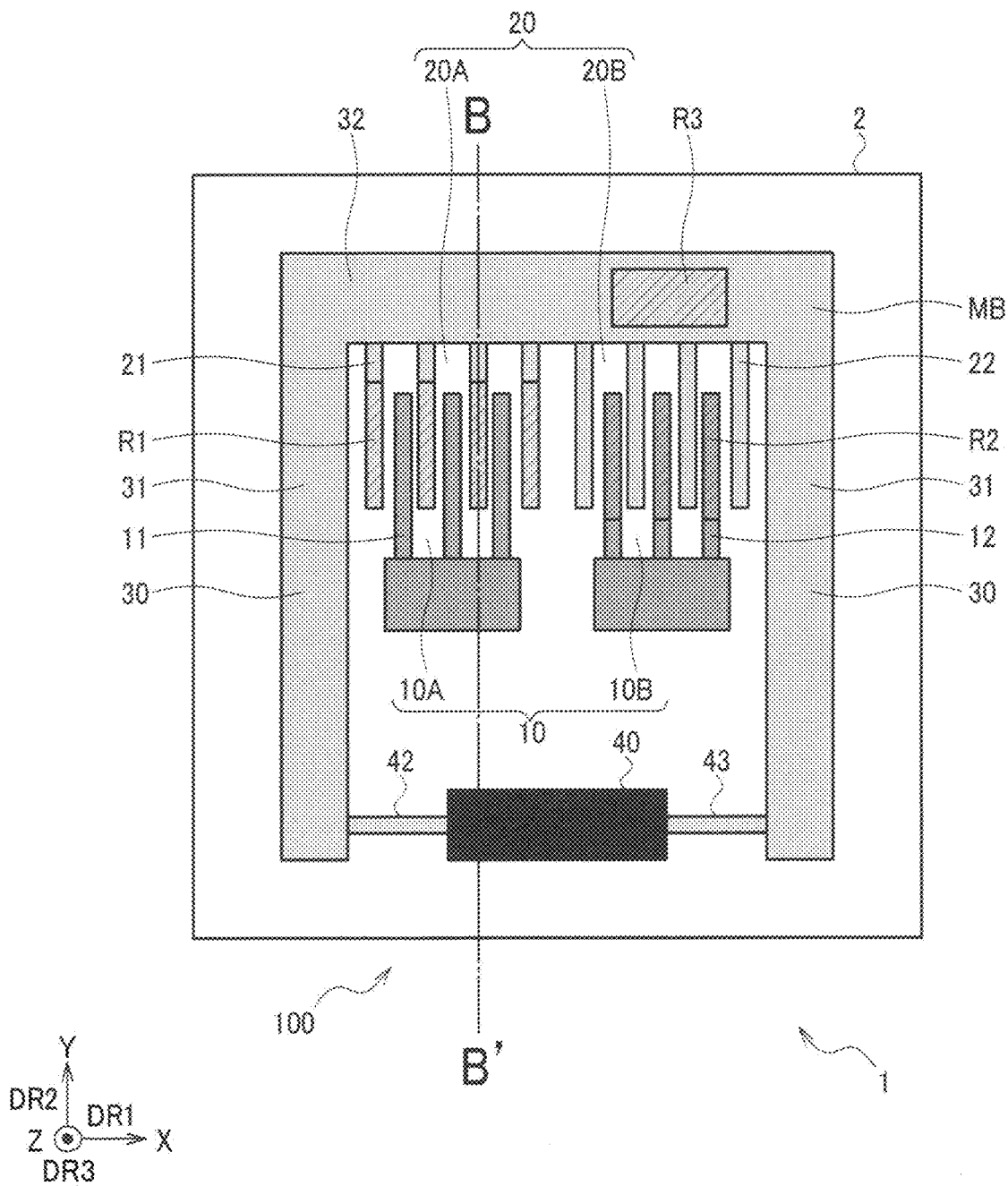
FIG. 13 is a plan view of the physical quantity sensor according to the embodiment.

Finally, a manufacturing method according to the embodiment will be described. FIG. 13 is a plan view of the physical quantity sensor 1 according to the embodiment shown in FIG. 1. Hereinafter, in FIGS. 14 to 21, the manufacturing method according to the embodiment will be described with reference to a cross-sectional view taken along a one-dot chain line coupling B and B' in the plan view shown in FIG. 13.

Figure 14:
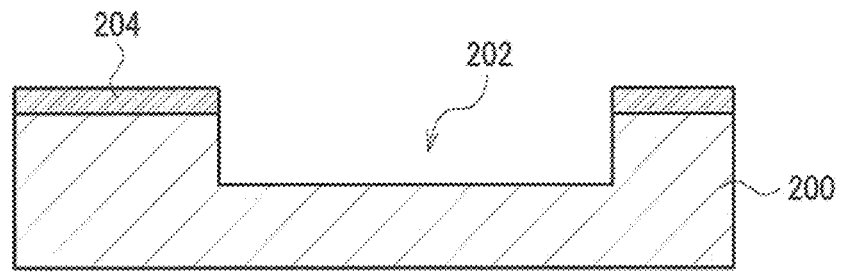
FIG. 14 is an explanatory diagram of a method for manufacturing the physical quantity sensor according to the embodiment.

First, as shown in FIG. 14, a silicon substrate 200 is prepared, a surface oxide film 204 of about 1 μm is formed, and patterning is performed by a photolithography technique. After the surface oxide film 204 is partially removed by wet etching such as buffered hydrogen fluoride (BHF), the silicon substrate 200 having a depth of about 20 μm to 50 μm is etched. The etching may be wet etching using KOH or TMAH, or dry etching using SF6 gas. Alternatively, silicon deep etching by a BOSCH process in which SF6 and C4F8 are alternately used may be performed. Accordingly, a cavity 202 is formed. The surface oxide film 204 which becomes unnecessary may be removed or left.

Figure 15:
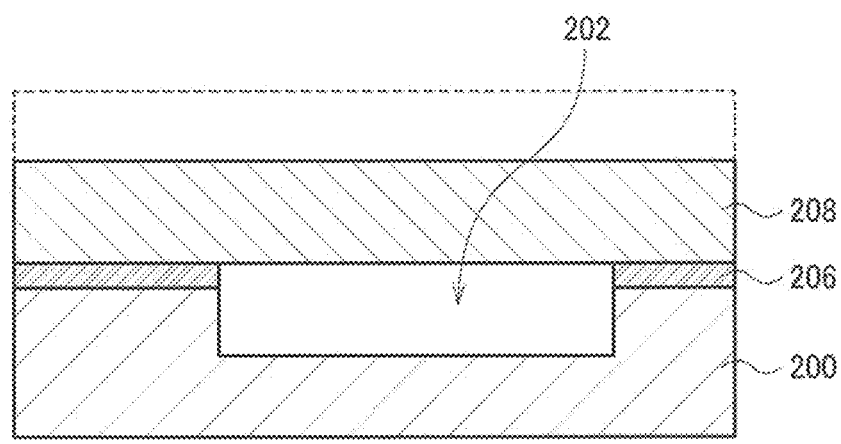
FIG. 15 is an explanatory diagram of a method for manufacturing the physical quantity sensor according to the embodiment.
Figure 16:
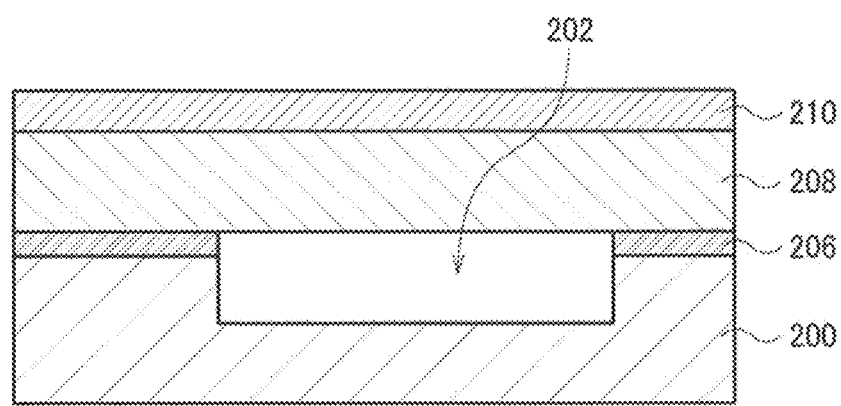
FIG. 16 is an explanatory diagram of a method for manufacturing the physical quantity sensor according to the embodiment.

Next, as shown in FIG. 15, the silicon substrate 200 is bonded to the wafer 208, which is a silicon substrate, serving as a structure layer. In the bonding, a burying insulating film 206 is formed on the silicon substrate, plasma activation of Ar, N2, or the like is performed, and then a water washing treatment or the like is performed to perform the bonding. Then, after the bonding, an annealing treatment at 500° C. to 1100° C. may be performed to enhance a strength. At this time, the burying insulating film 206 may remain at a bottom of the cavity 202. After the bonding, the wafer 208 is ground to form a structure layer having a thickness of about 20 μm to 30 μm. The wafer 208 can be ground by a process such as chemical mechanical polishing (CMP). Then, as shown in FIG. 16, a $SiO_2$ layer 210 serving as a hard mask is formed at the structure layer. The $SiO_2$ layer 210 can be formed by thermal oxidation, a chemical vapor deposition (CVD) film, a spin on-glass (SOG) film, or the like. Particularly, the $SiO_2$ layer 210 formed by the thermal oxidation is preferable in that it has a high selectivity during silicon etching. In the present manufacturing method, a thermal oxide film of about 1 μm is used.

Figure 17:
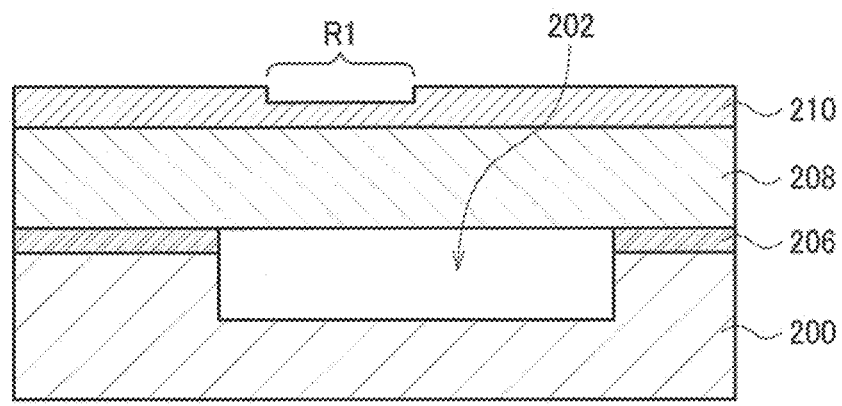
FIG. 17 is an explanatory diagram of a method for manufacturing the physical quantity sensor according to the embodiment.
Figure 18:
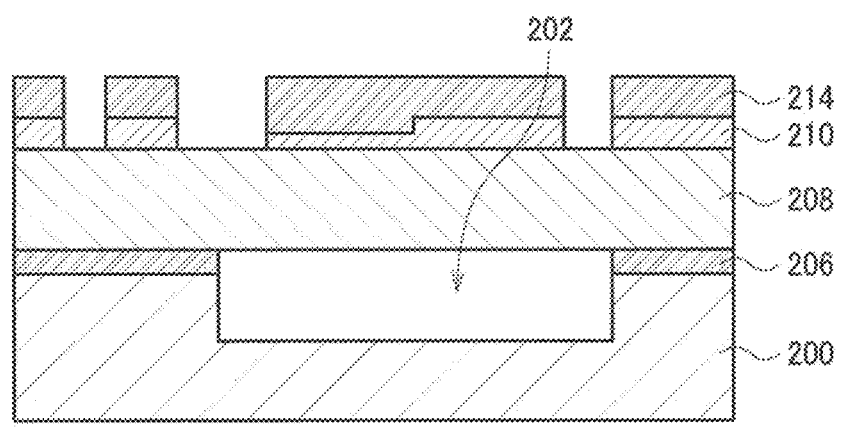
FIG. 18 is an explanatory diagram of a method for manufacturing the physical quantity sensor according to the embodiment.

Next, as shown in FIG. 17, patterning is performed by a photolithography method, and a film thickness of the $SiO_2$ layer 210 in a portion where the first recess R1 is provided is reduced by the wet etching or the like. Here, when the hard mask on the $SiO_2$ layer 210 is the thermal oxide film, the wet etching using BHF or the like is desirable. Then, as shown in FIG. 18, a photoresist 214 is formed, and outer shapes of the element units of the physical quantity sensor 1 are patterned. The SiO$_2$ layer 210 is processed by the dry etching or the like. For example, CHF3 gas can be used for the dry etching.

Figure 19:
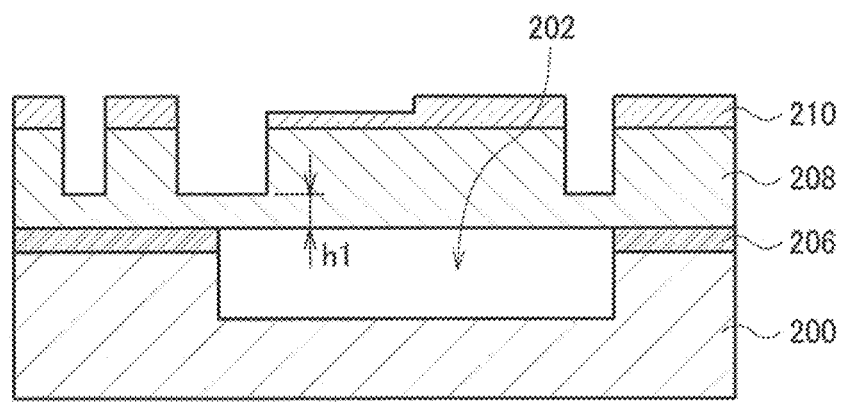
FIG. 19 is an explanatory diagram of a method for manufacturing the physical quantity sensor according to the embodiment.
Figure 22:
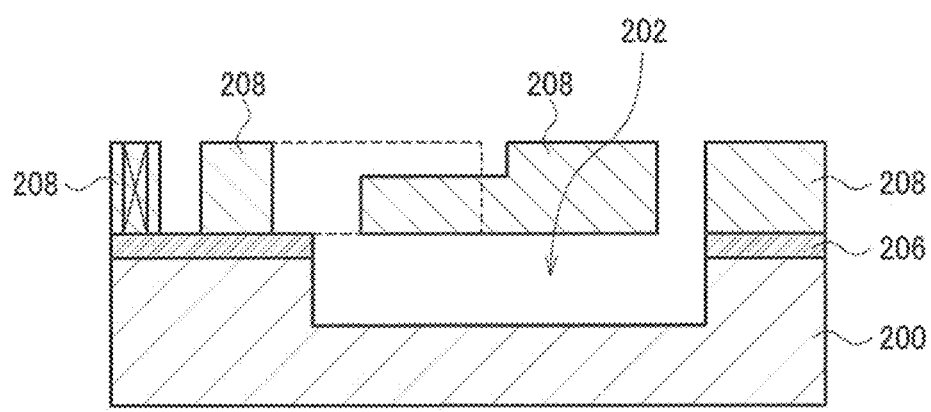
FIG. 22 is an explanatory diagram of a method for manufacturing the physical quantity sensor according to the embodiment.

Next, as shown in FIG. 19, the photoresist 214 which becomes unnecessary is removed by asking or the like, and the wafer 208 serving as the structure layer is etched by using, for example, a BOSCH method. Here, a depth at a time of processing by the etching is left by h1 from an outermost layer of the burying insulating film 206. Thereafter, as shown in FIG. 20, the SiO$_2$ layer 210 deposited as the hard mask is entirely etched to expose the silicon structure layer in the region where the first recess R1 is provided. An etching method may be the dry etching or the wet etching. Then, as shown in FIG. 21, when the etching of the entire silicon structure layer proceeds, the first recess R1 becomes a step having the depth h1, and the other portions are processed to a bottom portion to be in a penetrating state. Finally, as shown in FIG. 22, the hard mask which becomes unnecessary is removed.

Similar to the first recess R1, a recess recessed in the third direction DR3 is formed in a part of the structure layer in the regions where the second recess R2 and the third recess R3 are provided. Therefore, the second recess R2 and the third recess R3 can be provided by patterning the regions where the second recess R2 and the third recess R3 are provided at the SiO$_2$ layer 210 of the hard mask and etching the wafer 208 to be the structure layer.

As described above, the manufacturing method according to the embodiment is a method for manufacturing the physical quantity sensor 1 for detecting, when three directions orthogonal to one another are defined as the first direction DR1, the second direction DR2, and the third direction DR3, the physical quantity in the third direction DR3, and includes a fixed electrode unit forming step of forming the fixed electrode unit 10 at the substrate 2 and a movable body forming step of forming the movable body MB. The physical quantity sensor 1 includes the fixer 40 fixed to the substrate 2, one ends of the support beams 42 and 43 are coupled to the fixer 40, and the fixed electrode unit 10 is provided at the substrate 2 and includes the first fixed electrode group 10A and the second fixed electrode group 10B. The movable body MB includes the movable electrode unit 20 including the first movable electrode group 20A in which the movable electrodes 21 respectively face the fixed electrodes 11 of the first fixed electrode group 10A and the second movable electrode group 20B in which the movable electrodes 22 respectively face the fixed electrodes 12 of the second fixed electrode group 10B, and the frame unit 30 coupling the movable electrode unit 20 and the other ends of the support beams 42 and 43. In the fixed electrode unit forming step, the second fixed electrode group 10B is formed such that the second recess R2 recessed in the third direction DR3 is provided in the second fixed electrode group 10B. Further, in the movable body forming step, the first movable electrode group 20A is formed such that the first recess R1 recessed in the third direction is provided in the first movable electrode group 20A, and the movable body MB is formed such that the third recess R3 recessed in the third direction DR3 is provided in a region of the frame unit 30 on the second movable electrode group 20B side.

In the physical quantity sensor 1 according to the embodiment, to ensure mobility of the movable body MB, it is necessary to provide a certain space inside the first detection element 100 of the physical quantity sensor 1, and to form and dispose each component such as the movable body MB, the fixed electrode unit 10, and the support beams 42 and 43 in the space with the high accuracy. In addition, to eliminate the non-uniformity of the mass of the movable body MB, a configuration in which the recesses including the first recess R1, the second recess R2, and the third recess R3 are provided is employed, and as described above, there is also a need for collectively processing these recesses.

In this regard, according to the embodiment, the space inside the first detection element 100 can be provided by using the wafer bonding process after the cavity 202 is formed as described with reference to FIG. 15. Therefore, for example, complexity of the process of removing a sacrificial film once deposited by wet etching or the like can be avoided, and a degree of process difficulty can be reduced. When the processing by dry etching is performed, there are problems that the surface becomes rough and the yield decreases, but these problems can also be avoided. As described above, by adjusting the pattern of the third recess R3 in the plan view and optimizing the etching rate of the third recess R3, the recesses can be collectively processed, and rationalization of the manufacturing process and cost reduction can be implemented.

As described above, the physical quantity sensor according to the embodiment relates to a physical quantity sensor for detecting, when directions orthogonal to one another are defined as a first direction, a second direction, and a third direction, a physical quantity in the third direction. The physical quantity sensor includes a fixer fixed to a substrate, a support beam having one end coupled to the fixer, a fixed electrode unit provided at the substrate, and a movable body. The movable body includes a movable electrode unit, and a frame unit coupling the movable electrode unit and another end of the support beam. The fixed electrode unit includes a first fixed electrode group and a second fixed electrode group. The movable electrode unit includes a first movable electrode group in which a movable electrode faces a fixed electrode of the first fixed electrode group and a second movable electrode group in which a movable electrode faces a fixed electrode of the second fixed electrode group. The frame unit couples the movable electrode unit and the other end of the support beam. A first recess recessed in the third direction is provided in the first movable electrode group, a second recess recessed in the third direction is provided in the second fixed electrode group, and a third recess recessed in the third direction is provided in a region of the frame unit on a second movable electrode group side.

According to the embodiment, non-uniformity of a mass of the movable body of the physical quantity sensor in the axis in the first direction is eliminated, and a center of gravity of the physical quantity sensor does not deviate. Therefore, cross-axis sensitivity of the physical quantity sensor can be reduced, and detection accuracy of the physical quantity can be improved. In addition, the excellent physical quantity sensor having high long-term reliability in which unnecessary vibration due to the vibration or an impact from an outside is less likely to occur can be provided.

In the embodiment, the first recess and the third recess may have the same area in a plan view in the third direction.

In this way, by making depths of the first recess and the third recess equal to each other, the non-uniformity of the moment of inertia in the first direction with the first direction as a rotation axis can be eliminated. Therefore, the detection accuracy of the physical quantity sensor can be improved.

In the embodiment, the first recess and the third recess may have the same depth in the third direction.

In this way, by making the areas of the first recess and the third recess equal to each other in the plan view in the third direction, volumes of the first recess and the third recess can be made equal to each other. Therefore, the non-uniformity of the moment of inertia in the first direction with the first direction DR1 as the rotation axis can be eliminated, and the detection accuracy of the physical quantity sensor can be improved.

In the embodiment, the first recess and the third recess may have the same volume.

In this way, the non-uniformity of the moment of inertia I in the first direction DR1 with the first direction as the rotation axis can be eliminated, and the detection accuracy of the physical quantity of the physical quantity sensor 1 can be improved.

In the embodiment, the third recess may be divided into a plurality of divided recesses.

In this way, the third recess can be provided by being divided into the plurality of divided recesses. Therefore, by adjusting a pattern of the third recess, etching rates of the first recess and the third recess can be adjusted to be close to each other. Therefore, the first recess and the third recess can be processed to the same depth by the collective processing. Therefore, the non-uniformity of the moment of inertia of the movable body MB in the first direction can be eliminated by a simpler process, and the detection accuracy of the physical quantity can be improved.

In the embodiment, a width of the divided recess in the first direction may be the same as the width of each movable electrode of the first movable electrode group in the first direction.

In this way, when the first recess is implemented by the plurality of rectangular shapes, the non-uniformity of the mass of the movable body in the first direction can be eliminated when the same number of divided recesses having the same width as the rectangular shape are provided in the third recess.

In the embodiment, a total area of the plurality of divided recesses may be the same as an area of the first recess in the plan view in the third direction.

In this way, by adjusting the pattern of the divided recesses in the third direction and making the etching rates of the first recess and the third recess close to each other, the volumes of the first recess and the third recesses can be made equal to each other by the collective processing. Therefore, the detection sensitivity of the physical quantity of the physical quantity sensor can be improved by the simpler and low-cost manufacturing process.

In the embodiment, a length of the first recess in the second direction may be the same as a length of each movable electrode of the first movable electrode group in the second direction.

In this way, a large facing area of the fixed electrode and the movable electrode can be ensured, and the acceleration can be detected as a larger change in the capacitance. Therefore, the detection sensitivity of the physical quantity of the physical quantity sensor is improved.

In the embodiment, the movable body includes a first portion having one end coupled to the other end of the support beam and extending with the second direction as a long-side direction, and a second portion coupled to the one end of the first portion and extending with the first direction as a long-side direction.

In this way, the substantially U-shaped movable body can be implemented. Then, the movable body can move via the support beams 42 and 43 with the first direction as the rotation axis, and the physical quantity sensor can detect the acceleration in the third direction.

In the embodiment, the movable electrode unit is coupled to the second portion.

In this way, the movable electrode unit can move integrally with the second portion of the frame unit. Therefore, the physical quantity sensor can detect the acceleration in the third direction by the movement of the movable body with the first direction as the rotation axis.

In the embodiment, the third recess is provided in the second portion.

In this way, a part of the volume of the second portion of the frame unit can be reduced. Therefore, the non-uniformity of the mass of the movable body along the first direction due to the provision of the first recess can be eliminated, and the detection accuracy of the physical quantity of the physical quantity sensor is improved.

In addition, the embodiment relates to an inertial measurement unit including the physical quantity sensor described above, and a controller that performs control based on a detection signal output from the physical quantity sensor.

The manufacturing method according to the embodiment relates to a manufacturing method including a fixed electrode unit forming step of forming a fixed electrode unit at a substrate of a physical quantity sensor for detecting, when three directions orthogonal to one another are defined as a first direction, a second direction, and a third direction, a physical quantity in the third direction, and a movable body forming step of forming a movable body. The physical quantity sensor includes a fixer fixed to the substrate, one end of the support beam is coupled to the fixer, and the fixed electrode unit is provided at the substrate and includes a first fixed electrode group and a second fixed electrode group. The movable body includes a movable electrode unit including a first movable electrode group in which a movable electrode faces a fixed electrode of the first fixed electrode group and a second movable electrode group in which a movable electrode faces a fixed electrode of the second fixed electrode group, and a frame unit coupling the movable electrode unit and another end of the support beam. In the fixed electrode unit forming step, the second fixed electrode group is formed such that a second recess recessed in the third direction is provided in the second fixed electrode group. In the movable body forming step, the first movable electrode group is formed such that a first recess recessed in the third direction is provided in the first movable electrode group, and the movable body is formed such that a third recess recessed in the third direction is provided in a region of the frame unit on a second movable electrode group side.

According to the manufacturing method of the embodiment, the complexity of the manufacturing process can be avoided by using the wafer bonding process, and a degree of process difficulty can be reduced. In addition, by adjusting a pattern of the third recess in a plan view and optimizing an etching rate of the third recess, the recesses can be collectively processed. Therefore, rationalization and cost reduction of the manufacturing process can be implemented.

Although the embodiment has been described in detail as described above, it can be readily apparent to those skilled in the art that many modifications may be made without departing substantially from novel matters and effects of the present disclosure. Accordingly, such modifications are intended to be included in the scope of the present disclosure. For example, a term cited with a different term having a broader meaning or the same meaning at least once in the specification or the drawings can be replaced with a different term at any place in the specification or the drawings. All combinations of the embodiment and the modifications are also included in the scope of the present disclosure. Further, configurations, operations, and the like of the physical quantity sensor, the inertial measurement unit, and the manufacturing method are not limited to those described in the embodiment, and various modifications can be made.

What is claimed is:

1. A physical quantity sensor for detecting, when directions orthogonal to one another are defined as a first direction, a second direction, and a third direction, a physical quantity in the third direction, the physical quantity sensor comprising:
a fixer fixed to a substrate;
a support beam having one end and another end opposite to each other, the one end being coupled to the fixer;
a fixed electrode unit provided at the substrate and including a first fixed electrode group and a second fixed electrode group; and
a movable body including a movable electrode unit and a frame unit, the movable electrode unit including a first movable electrode group and a second movable electrode group, the frame unit coupling the movable electrode unit and the another end of the support beam, wherein
the first fixed electrode group is located at one side of the substrate and includes a plurality of first fixed electrodes,
the second fixed electrode group is located at an other side of the substrate and includes a plurality of second fixed electrodes,
the first movable electrode group is located at the one side of the substrate and includes a plurality of first movable electrodes,
the second movable electrode group is located at the other side of the substrate and includes a plurality of second movable electrodes,
one of the plurality of first fixed electrodes faces adjacent two of the plurality of first movable electrodes,
one of the plurality of second fixed electrodes faces adjacent two of the plurality of second movable electrodes,
a first recess recessed in the third direction is provided in each of the plurality of first movable electrodes,
a second recess recessed in the third direction is provided in each of the plurality of second fixed electrodes,
a third recess recessed in the third direction is provided in a first region of the frame unit on a side of the second movable electrode group,
the adjacent two of the plurality of first movable electrodes having the first recesses sandwich the one of the plurality of first fixed electrodes that is formed without having the second recess,
the adjacent two of the plurality of second movable electrodes that are formed without having the first recesses sandwich the one of the plurality of second fixed electrodes having the second recess, and
the first region of the frame unit is located only at a base from which the plurality of second movable electrodes extend.

2. The physical quantity sensor according to claim 1, wherein
an area of the first recess and an area of the third recess are the same in a plan view in the third direction.

3. The physical quantity sensor according to claim 2, wherein
a depth of the first recess in the third direction and a depth of the third recess in the third direction are the same.

4. The physical quantity sensor according to claim 1, wherein a volume of the first recess and a volume of the third recess are the same.

5. The physical quantity sensor according to claim 3, wherein
the third recess is divided into a plurality of divided recesses.

6. The physical quantity sensor according to claim 5, wherein
a width of one of the plurality of divided recesses in the first direction and a width of one of the plurality of first movable electrodes in the first direction are the same.

7. The physical quantity sensor according to claim 5, wherein
a total area of the plurality of divided recesses and an area of the first recess are the same in the plan view in the third direction.

8. The physical quantity sensor according to claim 1, wherein
a length of the first recess in the second direction and a length of one of the plurality of first movable electrodes in the second direction are the same.

9. The physical quantity sensor according to claim 1, wherein
the movable body includes
a first portion including one end side coupled to the another end of the support beam and disposed along the second direction, and
a second portion coupled to the one end side of the first portion and disposed along the first direction.

10. The physical quantity sensor according to claim 9, wherein
the movable electrode unit is coupled to the second portion.

11. The physical quantity sensor according to claim 9, wherein
the third recess is provided in the second portion.

12. An inertial measurement unit comprising:
the physical quantity sensor according to claim 1; and
a controller configured to perform control based on a detection signal output from the physical quantity sensor.

13. A method for manufacturing a physical quantity sensor for detecting, when three directions orthogonal to one another are defined as a first direction, a second direction, and a third direction, a physical quantity in the third direction, the method comprising:
a fixed electrode unit forming step of forming a fixed electrode unit at a substrate; and
a movable body forming step of forming a movable body, wherein
the physical quantity sensor includes a fixer fixed to the substrate,
one end of a support beam is coupled to the fixer,
the fixed electrode unit is provided at the substrate, and includes a first fixed electrode group and a second fixed electrode group,
the movable body includes
a movable electrode unit including a first movable electrode group and a second movable electrode group, and
a frame unit coupling the movable electrode unit and another end of the support beam,
the first fixed electrode group is located at one side of the substrate and includes a plurality of first fixed electrodes, the second fixed electrode group is located at an other side of the substrate and includes a plurality of second fixed electrodes, the first movable electrode group is located at the one side of the substrate and includes a plurality of first movable electrodes, the second movable electrode group is located at the other side of the substrate and includes a plurality of second movable electrodes, one of the plurality of first fixed electrodes faces adjacent two of the plurality of first movable electrodes, one of the plurality of second fixed electrodes faces adjacent two of the plurality of second movable electrodes, in the fixed electrode unit forming step,
   the second fixed electrode group is formed such that a second recess recessed in the third direction is provided in each of the plurality of second fixed electrodes, and in the movable body forming step,
   the first movable electrode group is formed such that a first recess recessed in the third direction is provided in each of the plurality of first movable electrodes the movable body is formed such that a third recess recessed in the third direction is provided in a first region of the frame unit on a side of the second movable electrode group, the adjacent two of the plurality of first movable electrodes having the first recesses sandwich the one of the plurality of first fixed electrodes that is formed without having the second recess, the adjacent two of the plurality of second movable electrodes that are formed without having the first recesses sandwich the one of the plurality of second fixed electrodes having the second recess, and the first region of the frame unit is located only at a base from which the plurality of second movable electrodes extend.

* * * * *